United States Patent [19]
Shimizu et al.

[11] Patent Number: 6,098,386
[45] Date of Patent: Aug. 8, 2000

[54] RIDING LAWN MOWER AND TRANSMISSION FOR THE SAME

[75] Inventors: Hiroaki Shimizu; Norihiro Ishii, both of Itami; Koji Irikura, Kobe, all of Japan; Robert Abend; Travis McCloud, both of Morristown, Tenn.

[73] Assignees: Kanzaki Kokyukoki Mfg. Co., Ltd., Hyogo-ken, Japan; Tuff Toro Corporation, Tenn.

[21] Appl. No.: 09/049,505

[22] Filed: Mar. 27, 1998

[51] Int. Cl.[7] ................................................. A01D 34/03
[52] U.S. Cl. .......................... 56/14.7; 56/16.7; 475/206; 180/375
[58] Field of Search .................................... 56/11.3, 11.5, 56/11.7, 11.8, 14.7, 15.8, 16.7, DIG. 6, DIG. 22; 475/200, 206; 180/76, 375

[56] References Cited

U.S. PATENT DOCUMENTS

| | | | |
|---|---|---|---|
| 4,920,734 | 5/1990 | Wenzel | 56/11.8 X |
| 5,145,019 | 9/1992 | Sebben et al. | |
| 5,367,861 | 11/1994 | Murakawa et al. | |
| 5,433,066 | 7/1995 | Wenzel et al. | 56/DIG. 22 |
| 5,816,033 | 10/1998 | Busboom | 56/DIG. 22 |

FOREIGN PATENT DOCUMENTS 0 213 096 A1   3/1987   European Pat. Off. .

*Primary Examiner*—H. Shackelford
*Attorney, Agent, or Firm*—Knobbe, Martens, Olson & Bear, LLP

[57] ABSTRACT

The present invention provides a riding lawn mower comprising: two pairs of ground engaging wheels 2, 2 and 3, 3 disposed at front and rear portions of a vehicle frame 5; a cutter blade 9 supported by the vehicle frame 5; a drive source 7 mounted on the vehicle frame 5 and having an output shaft 8 extending downwardly; a transmission 20 including i) a casing 21; ii) an input shaft 22 substantially vertically supported by the casing 21, and iii) a pair of axles 4, 4 extending substantially horizontally in opposite directions, the pair of axles supporting each one of the two pairs of ground engaging wheels, the transmission 20 being arranged below the drive source 7 and having the input shaft 22 coupled substantially coaxially with the output shaft 8 of the drive source 7 non-rotatably relative thereto; and power transmitting members 10 and 11 for the cutter blade 9, the power transmitting members 10 and 11 being provided to rotate with the output shaft 8.

8 Claims, 18 Drawing Sheets

RIDING LAWN MOWER AND TRANSMISSION FOR THE SAME

The present invention relates to a riding lawn mower and a transmission designed for the same and more particularly to a compact riding lawn mower.

Conventional lawn mowers comprise a pair of front ground engaging wheels and a pair of rear ground engaging wheels; front and rear axles coupled to the front and rear ground engaging wheels, respectively; a vehicle frame supported by the front and rear axles; a drive source such as engine mounted on the vehicle frame; a transmission for transmitting drive power from the drive source to the ground engaging wheels after changing the speed of drive power to a desirable degree and; a mower blade to which drive power is transmitted from the drive source. Drive power is transmitted via pulleys and belts from the drive source to the transmission and thereafter to the cutter blade.

In the case of transmitting drive power using pulleys and belts, a tension roller is required to tension a belt. As a result, the rotation axes of the pulleys must be located away from each other to a certain extent. This means that in the case of disposing the drive source and the transmission between the front and rear wheels, for example, the length from the drive source to the rear end of the vehicle frame is (the minimum necessary length L1 between the drive source E and the transmission T)+(the length L2 between the transmission T and the rear axle R) as shown in FIG. 18. In the figure, the symbol M denotes a cutter blade.

There have been various proposals to downsize riding lawn mowers. For example, U.S. Pat. No. 5,367,861 to Murakawa et al discloses a compact lawn mower. The lawn mower of Murakawa et al has a drive source E arranged on the front portion of the frame with respect to a rear axle R, and also has a transmission T arranged on the rear portion of the frame as shown in FIG. 19. This arrangement is based on the consideration that when drive power is transmitted using pulleys from a drive source to a transmission, the length L1 cannot be shortened. According to this mower, the distance between the drive source and the rear end of the frame is the length L1. Accordingly, the overall length of the mower can be reduced by the length L2.

Thus, the lawn mower of Murakawa et al successfully had the overall length reduced by the length L2. However, since the length L1 (from the drive source to the transmission) was not reduced, the entire riding lawn mower was not downsized sufficiently.

The present invention is made to solve the above disadvantages and to provide a riding lawn mower that has a reduced overall size.

SUMMARY OF THE INVENTION

To attain the above object, the present invention provides a riding lawn mower comprising: two pairs of ground engaging wheels disposed at front and rear portions of a vehicle frame; a cutter blade supported by the vehicle frame; a drive source mounted on the vehicle frame and having an output shaft extending downwardly; a transmission including i) a casing; ii) an input shaft substantially vertically supported by the casing, and iii) a pair of axles extending substantially horizontally in opposite directions, the pair of axles supporting each one of the two pairs of ground engaging wheels, the transmission being arranged below the drive source and having the input shaft that is coupled substantially coaxially with the output shaft of the drive source to rotate together; and a power transmitting member for the cutter blade, the power transmitting member being provided to rotate with the output shaft.

Preferably, the riding lawn mower comprises an adjuster for adjusting the alignment of the axes of the output shaft and the input shaft of the transmission.

Preferably, the drive source on the vehicle frame is disposed between the two ground engaging wheels.

Preferably, the lower end of the output shaft of the drive source is coupled via a bearing with the upper end of the input shaft of the transmission to ensure uniform rotation.

Preferably, a power transmitter for the cutter blade is provided on the outer surface of the coupling.

Preferably, the power transmitter for the cutter blade is used as a pulley and a belt, a space is provided between the lower end of the drive source output shaft and the upper end of the transmission input shaft to receive the belt, and the coupling is axially slidably mounted on the output shaft or the input shaft so that the coupling can take the positions of closing and opening the space, respectively.

Further, in order to attain the above object, the present invention provides a transmission comprising: a casing; an input shaft substantially vertically supported by the casing; first and second intermediate shafts substantially horizontally supported by the casing; a pair of axles substantially horizontally supported by the casing and extending from the casing in opposite directions; a gear train for transmitting the rotation of the input shaft to the first intermediate shaft; a friction clutch supported on the first intermediate shaft; a driving speed-change gear train rotatably supported on the first intermediate shaft; a driven speed-change gear train rotatably supported on the second intermediate shaft and meshing with the driving speed-change gear train; a shifter supported axially slidably on the second intermediate shaft non-rotatably relative thereto, wherein the shifter meshes one gear of the driven gear train with the second intermediate shaft in accordance with its axial position; an output gear provided or integrally formed on the second intermediate shaft non-rotatably relative thereto; and a differential gear meshing with the output shaft and transmitting drive power from the output shaft to the pair of axles, the friction clutch including: a driving friction member having a conical friction surface and supported on the first intermediate shaft in a non-rotatable and axially slidable manner; a driven friction member having a friction surface corresponding to the conical friction surface, rotatably supported on the first intermediate shaft and coupled with the driving gear train; and a clutch arm for sliding the driving friction member for engagement with the driven friction member.

Furthermore, the present invention provides a transmission comprising: a casing; an input shaft substantially vertically supported to one side of the casing; first and second intermediate shafts substantially horizontally supported in this order by the casing along a front and rear direction of a vehicle frame; a pair of axles substantially horizontally arranged behind the second intermediate shaft and extending outside of the casing in opposite directions; a gear train for transmitting the rotation of the input shaft to the first intermediate shaft; a driving speed-change gear train rotatably supported on the first intermediate shaft, wherein the driving speed-change gear is located to the input shaft along the first intermediate shaft; a friction clutch supported on the first intermediate shaft, wherein the friction clutch is located opposite the first input shaft along the first intermediate shaft, the friction clutch engaging and disengaging the first intermediate shaft with or from the driving speed-change gear train; a driven speed-change gear train rotatably supported on the second intermediate shaft, the driven speed-change gear train correspondingly meshing with the driving speed-change gear train; a shifter rotatably and axially slidably supported on the second intermediate shaft, wherein the shifter is located to the input shaft along the second intermediate shaft, the shifter means engaging one gear of the driven speed-change gear with the second intermediate shaft in accordance with its axial position; an output gear provided on or integrally formed on the second intermediate shaft non-rotatably relative thereto, wherein the output gear is located opposite the input gear along the second intermediate shaft; and a differential gear arranged opposite the input shaft in the casing, the differential gear meshing with the output gear to transmit drive power to the pair of axles.

DETAILED DESCRIPTION OF THE PREFERRED EMBODIMENTS

The preferred embodiments of riding lawn mower according to the invention will now be described with reference to the accompanying drawings.

Embodiment 1

Figure 1:
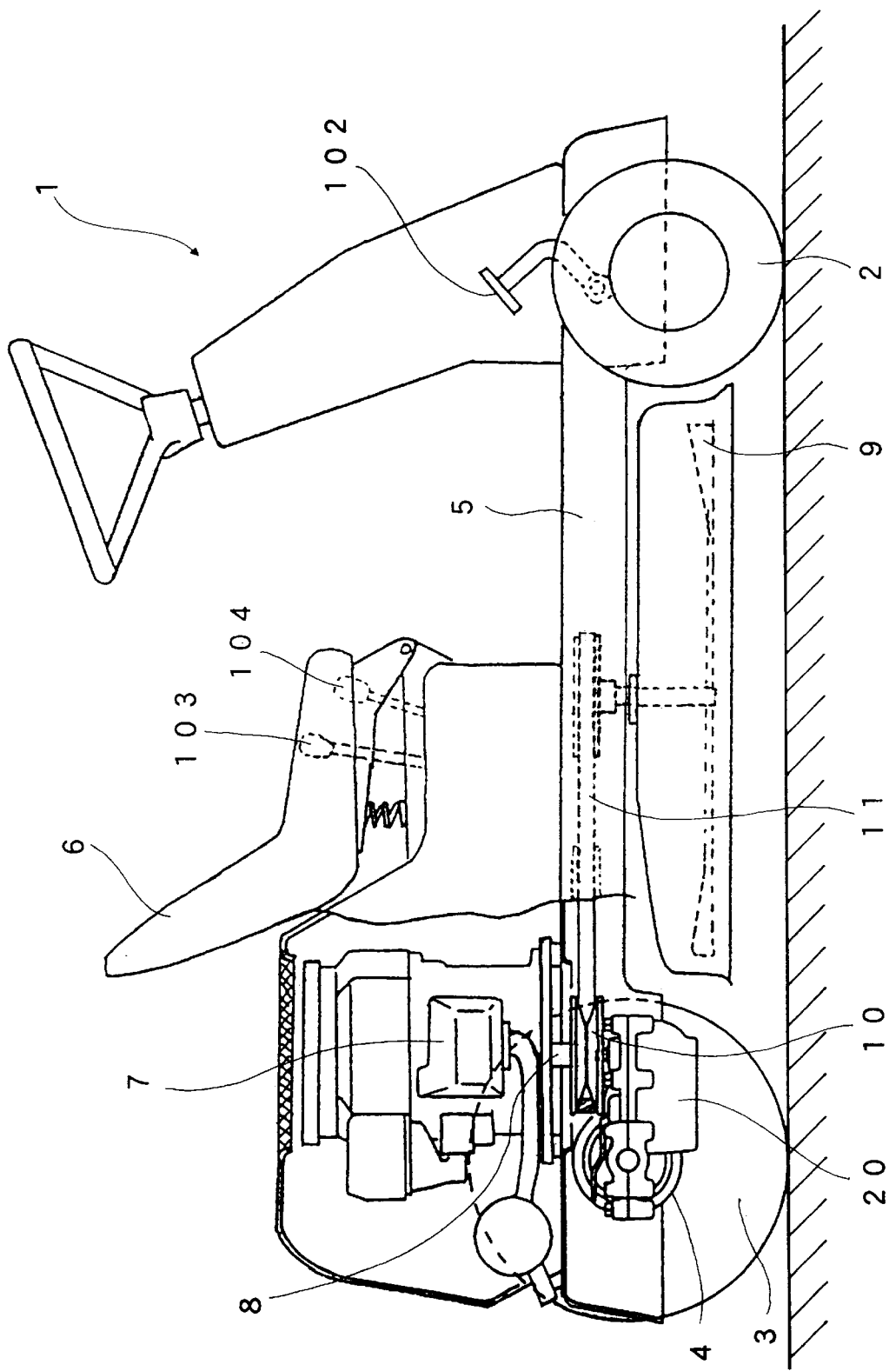
FIG. 1 is a side view schematically showing the internal structure of the riding lawn mower of Embodiment 1 of the present invention.

FIG. 1 is a side elevational view that schematically shows the internal structure of a riding lawn mower 1 of the first embodiment. As shown in FIG. 1, the riding lawn mower 1 comprises a pair of left and right front ground engaging wheels 2 and a pair of left and right rear ground engaging wheels 3; front (not shown) and rear axles 4 that are coupled to the front and rear ground engaging wheels 2 and 3, respectively; and a frame 5 supported by the front and rear axles. A seat 6 is attached on the central portion of the frame 5 in a longitudinal direction. A drive source, i.e., an engine 7 is mounted between the seat 6 and the rear axle 4. The engine 7 has an output shaft 8 extending substantially vertically downwardly. A transmission 20 is arranged substantially vertically below the engine 7.

The transmission 20 comprises an input shaft 22 (not shown in FIG. 1) that extends substantially vertically and upwardly. The input shaft 22 is substantially in axial alignment with the vertical output shaft 8 of the engine. In the frame 5, a cutter blade 9 is supported below the seat 6. Drive power is transmitted to the cutter blade 9 by a pulley 10 fitted to the output shaft 8 that rotates with the pulley and transmitted to a belt 11. In the figure, the reference numeral 102 is a pedal for activating a clutch and a brake, 103 is a speed control lever, and 104 is an cutter on/off lever.

Figure 2:
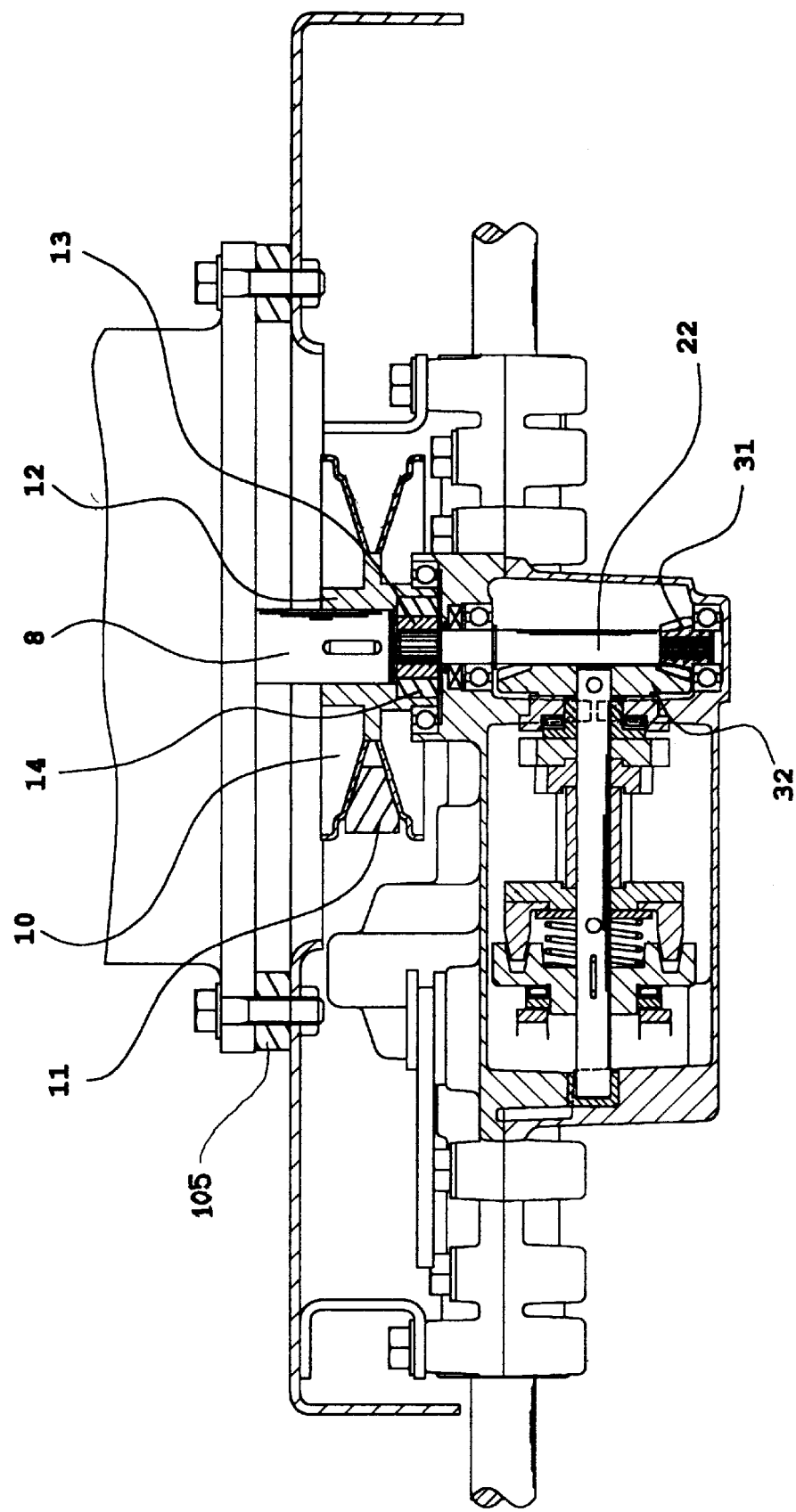
FIG. 2 is a front sectional view of the mechanism for transmitting drive power from the engine to the transmission and the mower of the riding lawn mower shown in FIG. 1.
Figure 3:
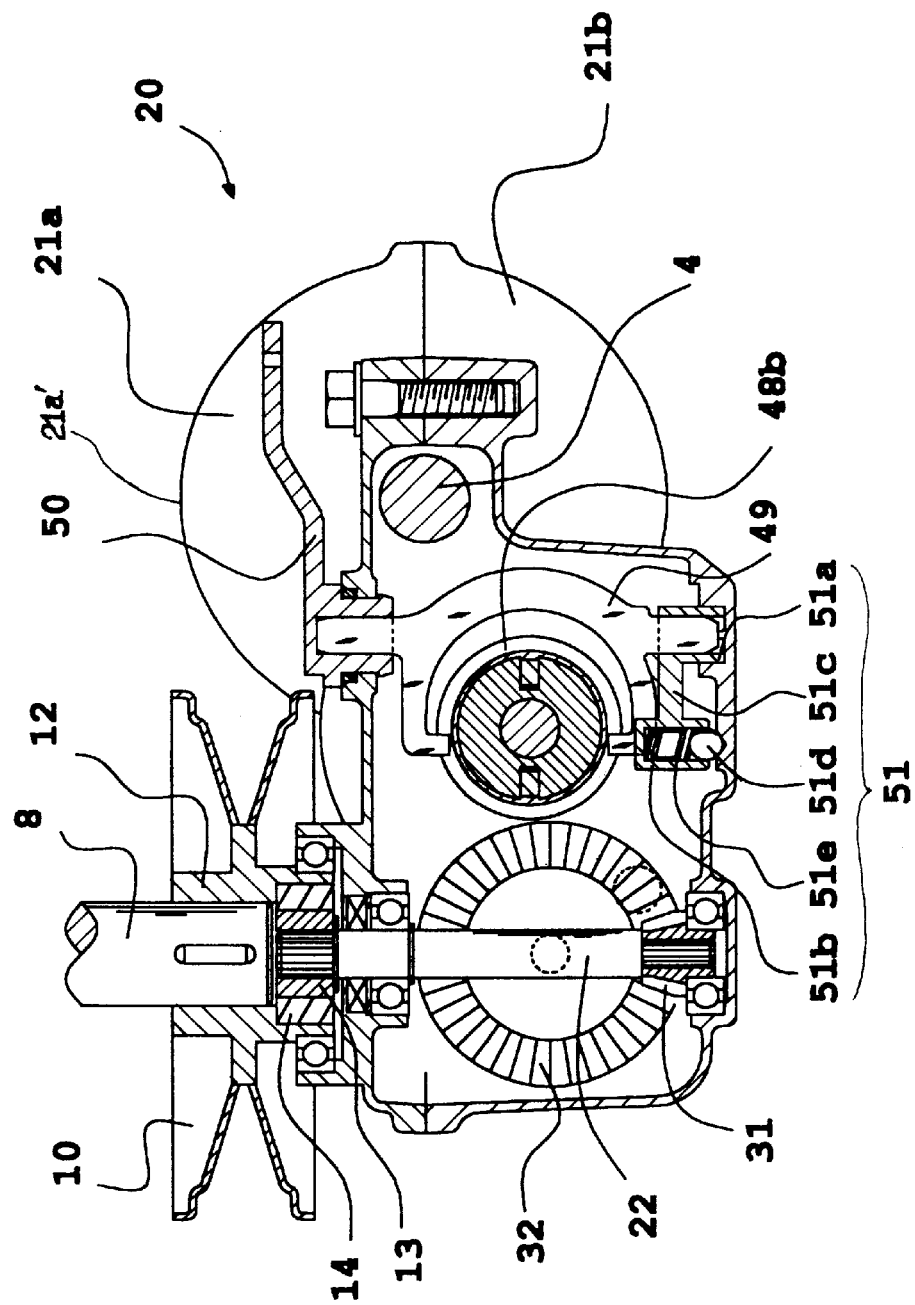
FIG. 3 is a side sectional view of the transmission of the riding lawn mower shown in FIG. 1.

Explained below with reference to FIGS. 2 and 3 is a mechanism for transmitting drive power from the engine 7 to the transmission 20 and the cutter blade 9. FIG. 2 is a front elevational view of the portion for transmitting drive power from the engine to the transmission and the mower. FIG. 3 is a side elevational view of that portion.

As shown in FIGS. 2 and 3, the engine output shaft 8 is substantially coaxial with the transmission input shaft 22. The lower end of the engine output shaft 8 is coupled via a coupling 12 to the upper end of the transmission input shaft 22 non-rotatably relative thereto. That is, the coupling 12 is a power transmitting member for transmitting drive power from the engine output shaft 8 to the transmission input shaft 22. The lower end of the coupling 12 is supported by a transmission casing via a bearing.

Inserted between the coupling 12 and the transmission input shaft 22 are an inner coupling 13 and a resilient member 14 in a relatively non-rotatable manner. The resilient member 14 acts as an axis-position adjuster for absorbing the positional displacement between the axes of the engine output shaft 8 and the transmission input shaft 22. Various materials may be used to produce the resilient member 14. Useful as the material is e.g., vulcanite.

Fitted around the outer surface of the coupling 12 non-rotatably relative thereto is a pulley 10 for transmitting drive power to the cutter blade 9. In the drawings, 11 indicates a belt passed on the pulley 10, and 105 indicates a vibration-proof rubber for absorbing the vibration generated by the engine.

As described, the engine output shaft 8 and the transmission input shaft 22 are substantially in axial alignment with each other and coupled by the coupling 12 non-rotatably relative thereto, whereby the following advantages can be obtained.

That is, according to conventional mower construction in which drive power is transmitted from an engine output to a transmission input through pulleys, it is required that the engine output shaft be distant to a certain extent from the transmission input shaft in order to interpose a tension roller for tensioning the V belt. Accordingly, it is difficult to reduce the overall length of the vehicle frame. On the other hand, according to the present embodiment, the engine output shaft is coupled to the transmission input shaft with a coupling. Therefore, both shafts can be arranged at the same position in a longitudinal direction, whereby it is possible to reduce the overall length of the vehicle frame.

According to the conventional construction, drive power is transmitted from the engine output shaft to the transmission input shaft by frictional contact between the V belt and the pulleys, and thus the V belt occasionally slips relative to the pulleys because of dust, oil, rainwater or the like. Thus, power transmission efficiency may readily be reduced. On the other hand, according to the present embodiment, these disadvantages can effectively be eliminated.

According to the conventional construction, the lower end of the output shaft and the upper end of the input shaft are not supported, it is difficult to rotate these shafts stably without generating vibration. On the other hand, according to the present embodiment, the lower end of the output shaft 8 and the upper end of the input shaft 22 are supported by the coupling 12, whereby these shafts can more stably be rotated. Accordingly, it is possible to improve the transmission efficiency of the power transmitted from the engine input shaft 8 to the transmission input shaft 22. Further, since the lower end of the coupling 12 is supported by the transmission casing via a bearing, it is possible to reduce the load applied on the power transmitting portion around the shafts 8 and 22, thereby reducing the wear of the resilient member 14.

Further, since the coupling 12 comprises the resilient member 14 as an axis position adjuster, it is possible to absorb the positional displacement between the axes of the engine output shaft 8 and the transmission input shaft 22, which displacement is often generated in assembling a vehicle due to production errors, assembling errors or the like. Therefore, according to the present embodiment, it is possible to transmit drive power efficiently from the engine output shaft 8 to the transmission input shaft 22.

Furthermore, according to the present embodiment, the pulley 10 for driving the cutter blade is fitted to the coupling 12, and thus the following advantages can be obtained. According to a conventional riding lawn mower in which pulleys are used to transmit drive power from the engine to the transmission, a space must be provided between the engine and the transmission so as to accommodate two pulleys disposed vertically and in parallel, i.e., a pulley for driving the ground engaging wheels and a pulley for driving the cutter blade. Such a construction requires an engine and other related parts to be mounted on the upper portion of a vehicle, thereby causing the running stability to worsen due to the high center of gravity of the vehicle.

On the other hand, according to the present embodiment, the output shaft 8 and the input shaft 22 are coupled via the coupling 12, and the pulley 10 for driving the cutter blade is fitted to the coupling 12 as described above, so that it is possible to reduce the vertical distance between the engine and the transmission because of using a single pulley therebetween. Accordingly, as compared with the conventional mower construction, it is possible to mount an engine and other related parts at a lower portion of a vehicle, whereby the running stability is improved because of the low center of gravity. Further, since the above construction uses a coupling in lieu of a pulley for driving the vehicle, it is possible to reduce production cost by reducing the number of parts such as a tension roller, etc.

Next, the transmission according to the present embodiment will be described with reference to FIGS. 2–10.

Figure 4:
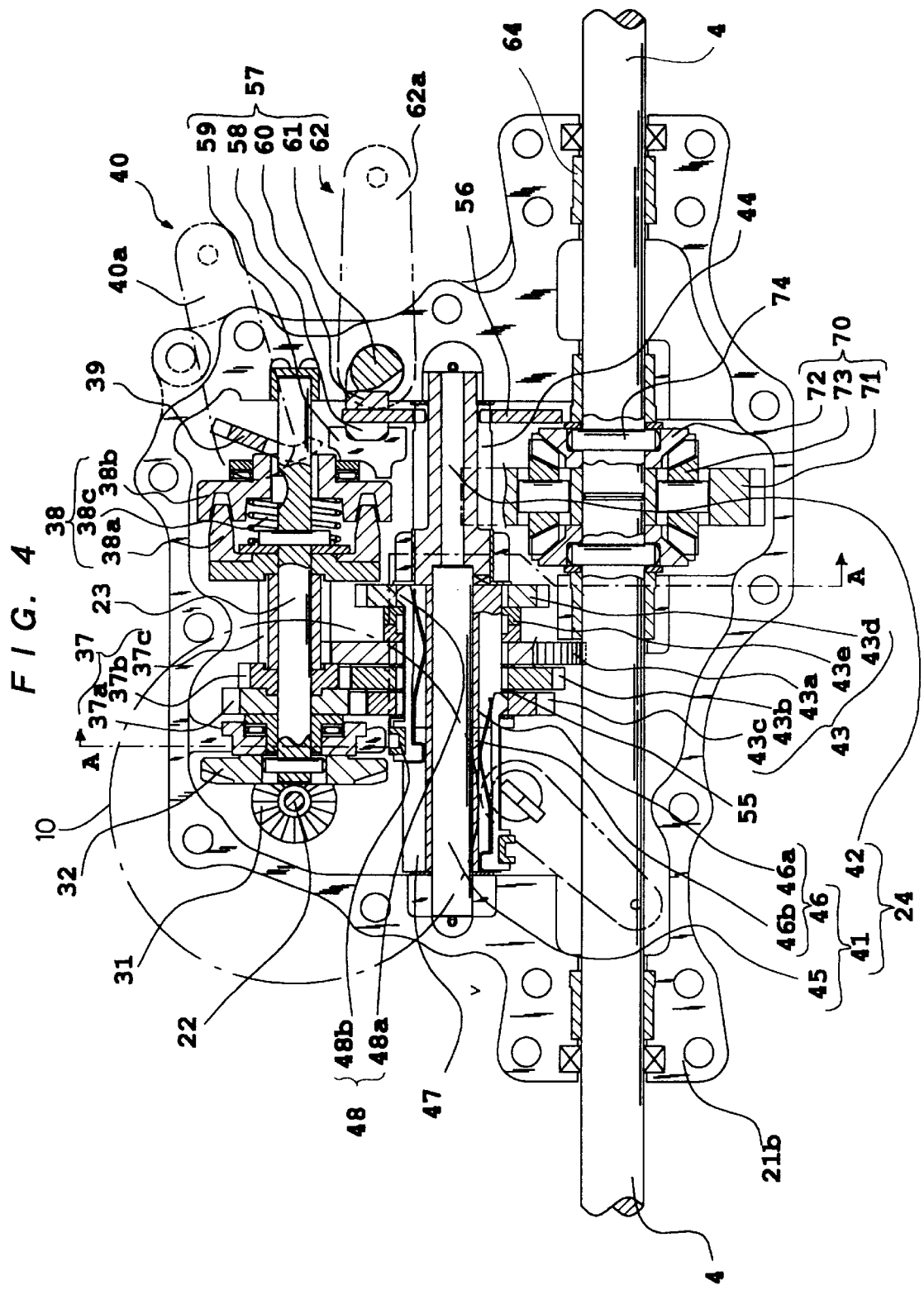
FIG. 4 is a plan sectional view of the transmission shown in FIG. 3.

As shown in FIG. 4, the transmission 20 comprises casing halve 21a and 21b separated along the mating face containing the axis of the rear axle 4; an input shaft 22 extending substantially vertically upwardly, and shaft 22 being arranged to the front end of the casing 21 and to one side of the casing 21 in a width direction; a first intermediate shaft 23 substantially horizontally supported to the front end of the casing 21; a second intermediate shaft 24 supported behind and in parallel with the first intermediate shaft with no intervening shaft being provided therebetween; a pair of rear axles 4, 4 disposed behind and in parallel with the second intermediate shaft without no intervening shaft being provided therebetween; and a differential gear 70 for transmitting drive power from the second intermediate shaft to the pair of axles, the differential gear 70 being arranged to the rear end of the casing 21 and to the other side of the casing 21 in a width direction.

The input shaft 22 is supported by the upper and lower casing halves 21a and 21b via bearings. Affixed at the lower end of the input shaft 22 is a bevel gear 31, which is in mesh with a large bevel gear 32 affixed at one end of the first intermediate shaft 23. In other words, drive power is transmitted from the input shaft 22 to the first intermediate shaft 23 by the direction-change gear train consisting of the bevel gear 31 and the large bevel gear 32. In lieu of the said bevel gears, hypoid gears or worm gears may be used to constitute the direction-change gear train.

The first intermediate shaft 23 has its one end near the input shaft supported between brackets 33 and 34 integrally formed on the casing halves 21a and 21b, via an intermediate member 35 and a bush 36. The other end of the first intermediate shaft 23 is supported in a hole formed in the lower casing half 21b via a bush. Hereinafter, in the two halves of the casing divided by the imaginary median plane extending perpendicular to the first intermediate shaft 23, the half side nearer the input shaft 22 (i.e., the left half side of the casing in FIG. 4) is referred to as the first side, and the other half side (i.e., the right half side of the casing in FIG. 4) is referred to as the second side. Rotatably mounted on the first intermediate shaft 23 and located to the said one end thereof is a driving-side speed-change gear train 37 comprising a first forward and rearward gear 37c, a second forward gear 37b, and a third forward gear 37a. Further, a friction clutch 38 is mounted on the first intermediate shaft 23 and located to the said other end thereof.

The friction clutch 38 comprises a driven friction member 38a rotatably supported on the intermediate shaft 23 and coupled to the speed-change gear train 37, a driving friction member 38b located outer than the driven friction member 38a and axially slidably supported on the first intermediate shaft 23 for rotation therewith, and a spring member 38c located between the driven friction member 38a and the driving friction member 38b and urging the driving friction member 38b away from the driven friction member 38.

The driven friction member 38a of the present embodiment comprises an annular friction cone having an outer cone-shaped face and a cone carrier supporting the cone. The cone may consist of circumferentially arranged pieces. Further, the driving friction member 38b of the present embodiment comprises a cone cave having an inner cone-shaped face for engaging the cone. Furthermore, a coil spring is employed as the spring member 38c.

A clutch fork 39 is disposed on the side of the driving friction member 38b opposite the driven friction member 38a. A clutch arm 40 is coupled to the clutch fork 39. The clutch arm 40 is supported by the upper casing half 21a in such a manner that a swing arm 40a can swing in a substantially horizontal plane. In cooperation with the swing motion of the swing arm 40a (in this embodiment shown in FIG. 4, swing motion in a clockwise direction when viewed from above), the clutch fork 39 presses the driving friction member 38b to the driven friction member 38a against the biasing force of the spring member 38c. By pressing, the driving friction member 38b fictionally engages the driven friction member 38a so that drive power is transmitted from the driving friction member 38b to the driven friction member 38a to thereby rotate the gear train 37 in mesh with the driven friction member 38a.

As described, in the case of using a friction clutch, drive power is transmitted through frictional engagement. Therefore, in order to permit a large amount of torque to be transmitted with a small pressing force, it is necessary to provide a large engaging area between the driving and driven friction members. Accordingly, in the case of using a disk-shaped friction member, it is necessary to increase the diameter of the friction member or increase the number of disks, thereby increasing the overall size of the friction clutch or increasing the production cost of the clutch due to the increased number of clutch disks. On the other hand, according to the present embodiment, since the engaging faces of the coupled friction members are cone-shaped, the engaging area therebetween is sufficiently large, so that a large amount of torque can be transmitted without increasing the size of the friction members.

Further, in the case of employing a multiplate friction clutch, no spring member can be used, and thus the driving and driven friction members are likely to contact each other even during clutch disengagement. Therefore, during clutch disengagement mode, drive power may unexpectedly be transmitted to the driven-side members. On the other hand, according to the present embodiment, the spring member urges the driving friction member away from the driven friction member. Consequently, it is possible to effectively prevent undesired contact between the driving and driven friction members during clutch disengagement mode. Therefore, according to the present embodiment, it is possible to solve the problem that undesired drive power is transmitted to the driven-side members during clutch disengagement mode.

Figure 7:
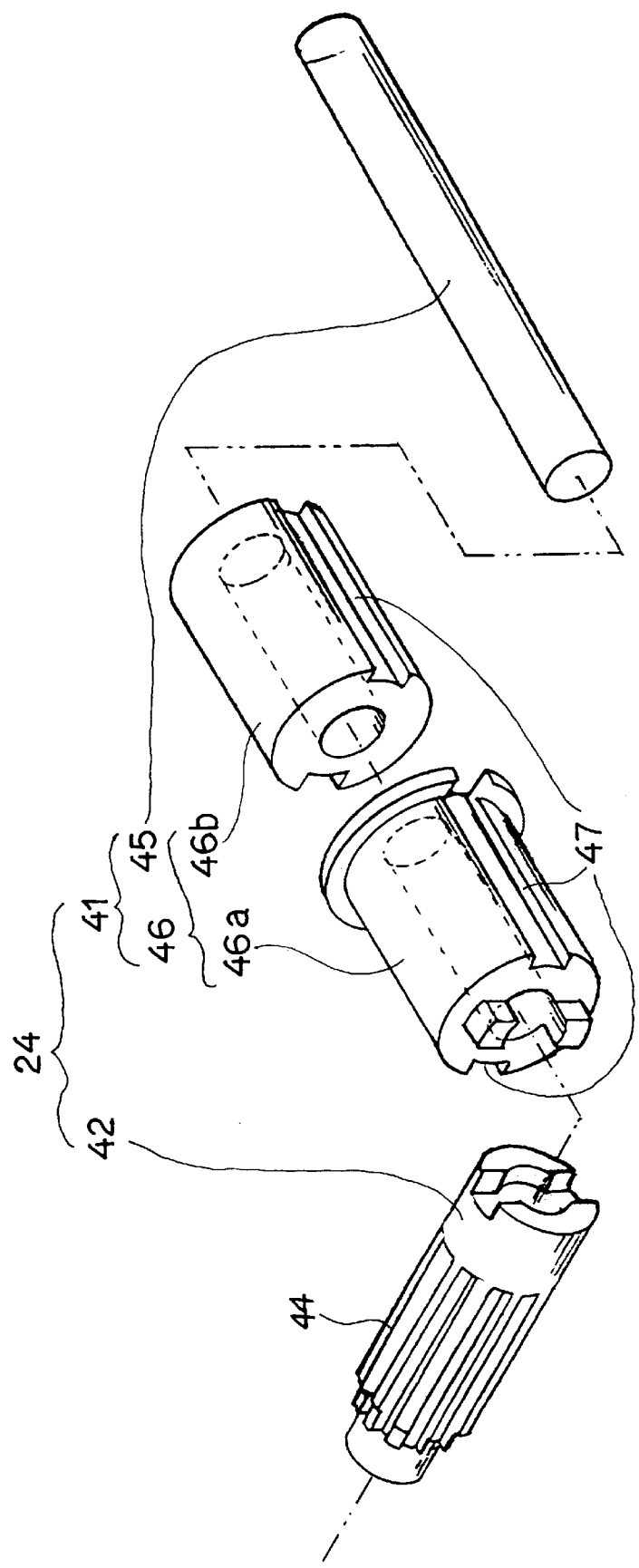
FIG. 7 is an exploded view of the second intermediate shaft assembly of the transmission shown in FIG. 3.

The second intermediate shaft 24 is supported by the casing 21 behind and substantially in parallel with the first intermediate shaft 23 with no shaft being intervened therebetween. As shown in FIG. 7, the second intermediate shaft 24 comprises a first section 41, on the said first side, for supporting a driven gear train 43 and a second section 42, on the said second side, provided with an output shaft 44. These sections are separatably coupled with each other for rotation therewith by engaging members that are formed on or in the facing end faces. As described, by separating the second intermediate shaft into a plurality of sections, it is possible to make it from sintered alloy, thereby reducing the production cost therefor. More specifically, when employing a long and one-piece second shaft, it is necessary to choose a strong material such as SUS. This leads to an increased production cost due to an increased material cost and increased processing cost. The present embodiment has no such disadvantages.

The first section 41 is of the double construction constituted by a securing member 45 having a solid cylindrical shape and a rotation member 46 having a hollow cylindrical shape and rotatably supported on the securing member 45.

The securing member 45 is rotatably supported at one end by the lower casing half 21b and at the other end by one end of the second section 42. The rotation member 46 has one end coupled to the second section 42 in a non-rotatable manner.

Formed in the outer surface of the rotation member 46 are a pair of long grooves 47. As shown in FIG. 4, the rotation member 46 comprises a power transmitting portion 46a for supporting the driven gear train 43 and the remaining portion 46b which are coupled to each other in a non-rotatable manner. The rotation member can integrally be formed. However, according to the present embodiment, the power transmitting part 46 receiving load is made of sintered alloy, and the remaining portion 46b is made of resin, whereby production cost is reduced due to the reduced material cost.

A pair of shifter keys 48 are inserted into the long grooves 47 of the rotation member 46 in an axially slidable manner. Each of the shifter key 48 comprises, at its one end portion, a projection 48a projecting radially outwardly of the second intermediate shaft 24 and a circumferential groove 48b at the opposite end portion. Disposed between the shifter key 48 and the bottom of the long groove 47 is a flat spring that urges the projection 48a radially outwardly of the second intermediate shaft 24.

As shown in FIG. 3, a pair of claws of a shifter fork 49 engages the circumferential grooves 48b. The upper end of the shifter fork 49 is coupled to a shift arm 50 non-rotatably relative thereto. The shift arm 50 is supported by the upper casing half 21a in a horizontally rotatable manner. The lower end of the shift fork 49 is rotatably supported by a bush portion 51a of a shift detent 51. Thus, when the shifter arm 50 is rotated, the shifter fork 49 is also rotated so that the shifter keys 48 slide axially along the second intermediate shaft 24.

The shift detent 51 comprises a case 51b having a hole the upper end of which is closed. The case 51b and the bush portion 51a are coupled by an arm 51c. The case 51b holds a detent ball 51d between the hole and the inner bottom of the lower casing half. Inserted between the ball 51d and the upper wall of the case 51b is a coil spring 51e. Formed in the inner bottom of the lower casing half 21b are a number of cavities for receiving the ball 51d at the positions corresponding to the engagement positions of the shifter keys 48 with the respective speed-change gears. With this construction, it is possible to prevent the shifter from shifting during speed-change operation and to improve operation feeling.

As shown in FIG. 4, the driven gear train 43 is supported in a rotatable and axially non-slidable manner on the power transmitting portion 46a of the rotation member 46. The gear train 43 comprises a first speed gear 43a, a second speed gear 43b, a third speed gear 43c and a rearward gear 43d and a neutral collar 43e. Among these gears, the first, second and third speed gears constantly mesh with the corresponding gears of the driving gear train 37. On the other hand, the rearward gear 43d meshes with the first forward and rearward gear 37c of the driving gear train 37 via a direction-change gear (not shown in FIG. 4).

Figure 6:
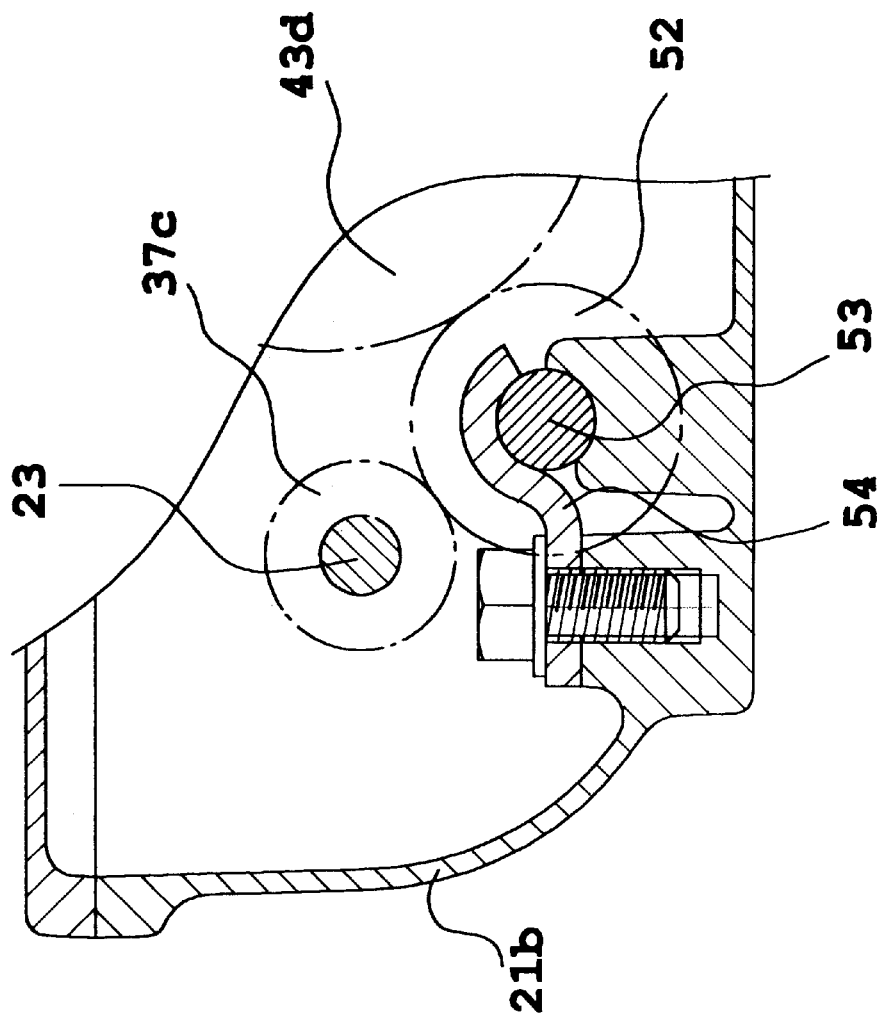
FIG. 6 is a view showing how a backward idling shaft is attached.

As shown in FIG. 6, the direction-change gear 52 is rotatably supported on an idling shaft 53. The idling shaft 53 is supported by a support member 54 on the inner bottom of the lower casing half 21b in parallel with the first intermediate shaft 23. As described, since the idling shaft 53 is supported by the inner bottom of the lower casing half 21b, it is possible to increase the layout freedom of a transmission.

Key grooves for engaging the projection 48a of the shifter key are formed in the inner surfaces of the respective gears 43a–43d of the driven gear train 43 and the neutral collar 43e. Accordingly, when the projection 48a of the shifter key engages the key groove of one of the gears of the driven gear train 43 or the neutral collar, the rotation of the driving gear train 37 can be transmitted to the rotation member 46 via the shifter key 48. Since the rotation member 46 is coupled to the output portion 42 of the output gear 44 non-rotatably relative thereto as described, the output gear 44 rotates with rotation of the rotation member 46.

The neutral collar 43e is constituted by two facing ring-shaped members. Each of the two ring-shaped members is provided with an annular indentation in the inner circumferential surface that opens toward a central hole. With this construction, it becomes unnecessary to provide a special partition so as to hold the shifter key at a neutral position, thereby reducing production cost because of the reduced number of parts. More specifically, a ring-shaped partitions 55 is provided in the key groove of the respective gears of the driven gear train 43 so as to hold the projection 48a of the shifter key in the key groove of the selected speed gear. By constructing the neutral collar 43e as described above, the above-mentioned indentation holds the projection. Accordingly, it is unnecessary to provide partitions on the opposite sides of the neutral collar 43e, thereby reducing the number of parts. Moreover, since the neutral collar 43e is of the symmetrical mating construction, the two ring shaped members have an identical shape, and the annular indentation can readily be produced.

The second section 42 of the second intermediate shaft is supported at the opposite ends by the casing. The central portion of the second section 42 is an output gear 44. More specifically, the second section itself constitutes an output gear. According to the present embodiment, the above-described construction is employed in order to reduce the number of necessary parts. Alternatively, an output gear can be fitted to the second section as a single unit.

A brake mechanism comprising a brake assembly 57 and a member 56 to be braked is located between the first and second intermediate shafts and to the said second side of the casing.

The member to be braked 56 is fitted to the second section 42 of the second intermediate shaft 24 non-rotatably relative thereto. As the member 56, a single brake disk may be used.

The brake assembly 57 comprises a first brake pad 58 located on one side of the outer portion of the member to be braked 56; a securing member 59 for supporting the first brake pad 58, the securing member being secured between the upper and lower casing halves; a second brake pad 60 located on the other side of the outer portion of the member to be braked 56, the second brake pad 60 being slidable along the second intermediate shaft; a pressure member 61 for clamping the member 56 by pressing the second brake pad 60 against the first brake pad 58; and a brake arm 62 coupled to the pressure member 61. The brake arm 62 has a swing arm 62a of reversed-L shape, which is so supported by the casing as to swing substantially in the same plane as the swing arm 40a of the clutch arm swings. More specifically, by swinging the brake arm 62 horizontally (counterclockwise swinging as viewed from above according to the present embodiment), the pressure member 61 presses the first and second brake pads 58 and 60 with the member to be braked 56, whereby the output gear 44 is braked by frictional resistance through pressure.

As described, since the brake mechanism is arranged between the first and second intermediate shafts 23 and 24 and to the second side of the casing, the securing member 59 of the brake mechanism can function as a slide stopper for the driving friction member 38b of the friction clutch, thereby reducing production cost because of the reduced number of parts. More specifically, since the driving friction member 38b is urged toward said second side of the casing by the spring member 38c as described above, it is necessary to provide means for stopping the slide movement of the driving friction member 38b. By contrast, according to the present embodiment, the provision of such means is unnecessary, thereby reducing production cost because of the reduced number of parts.

According to a general riding lawn mower, the clutch is constructed to cooperate with the brake, i.e., the clutch disengagement is associated with the actuation with the brake, so that the mower may not unexpectedly move rearward (or forward) when speed change operation is conducted on a slope or the like. According to the present embodiment, it is possible to operate the clutch and brake cooperatively with ease.

More specifically, according to the transmission of the present embodiment, the first intermediate shaft 23 is arranged to the front end of the casing 21, the input shaft 22 is arranged to said first side in a width direction of the casing 21, and the friction clutch 38 is arranged to the said second side of the casing, as described above. Furthermore, the second intermediate shaft 24 having the output shaft is arranged behind the first intermediate shaft 23 with no intervening shaft being disposed therebetween, and the brake mechanism for braking the output gear is arranged between the first and second intermediate shafts 23 and 24 and to the said second side of the casing 21. With this construction, the clutch arm 40 can be positioned adjacent the brake arm 62.

Figure 8:
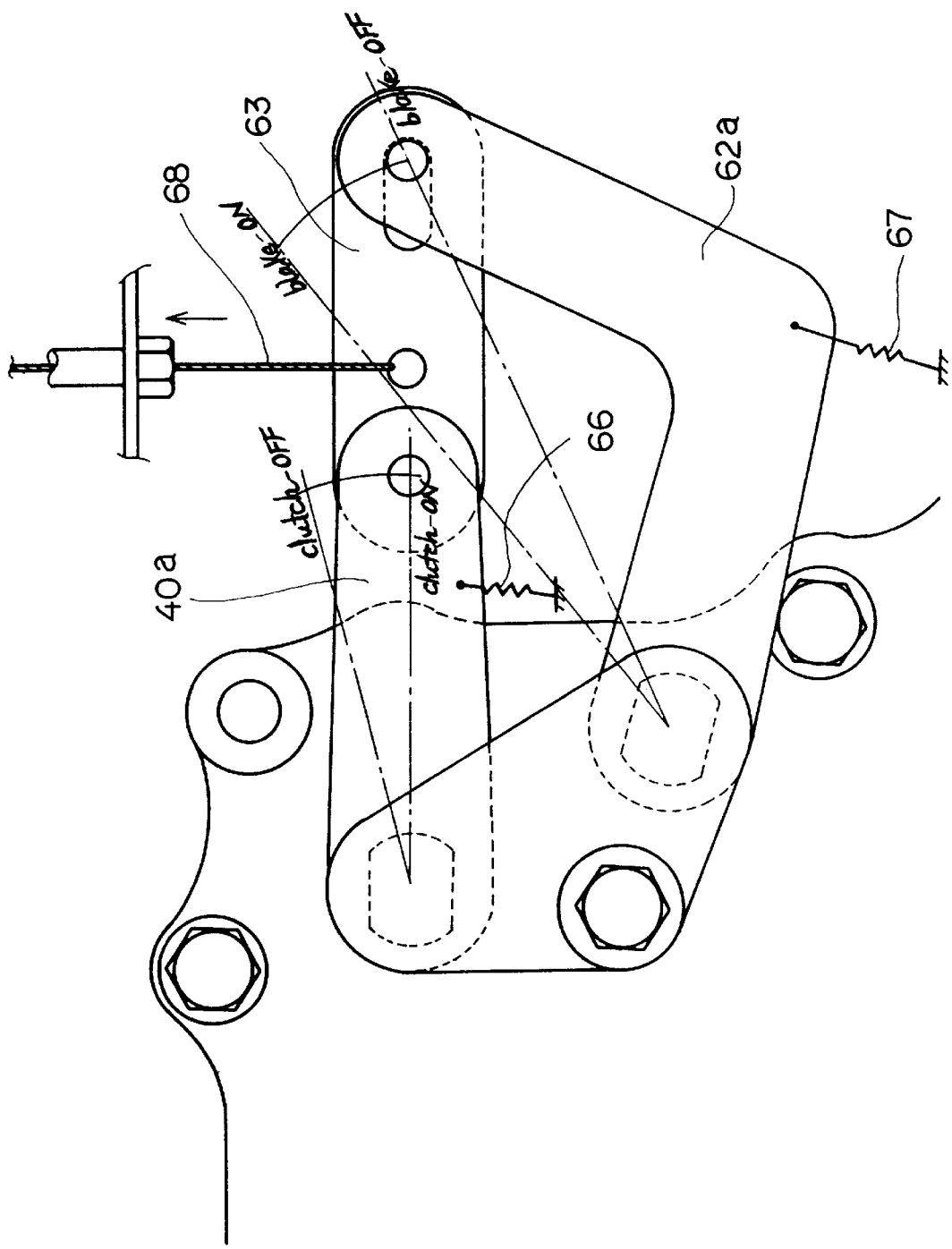
FIGS. 8–10 are figures for explaining the internal operations of the clutch arm and the brake arm of the riding lawn mower shown in FIG. 1.

Referring to FIG. 8 which shows the arrangement of both arms, the present embodiment has the swing arms 40a and 62a coupled at their free ends using a link member 63. The link member 63 has a circular hole 63a formed at its one end and has an elongated hole 63b at its other end. The clutch arm 40 and the brake arm 62 are coupled to the link member 63 by connecting pins via the circular hole 63a and the elongated hole 63b, respectively.

The clutch arm 40 and the brake arm 62 are constantly urged toward a counterclockwise direction by spring members 66 and 67 such as coil springs as viewed from above. Further, the link member 63 is coupled to a clutch pedal 102 (see FIG. 1) located at the driver's seat through a connecting member 68 such as a wire.

Figure 9:
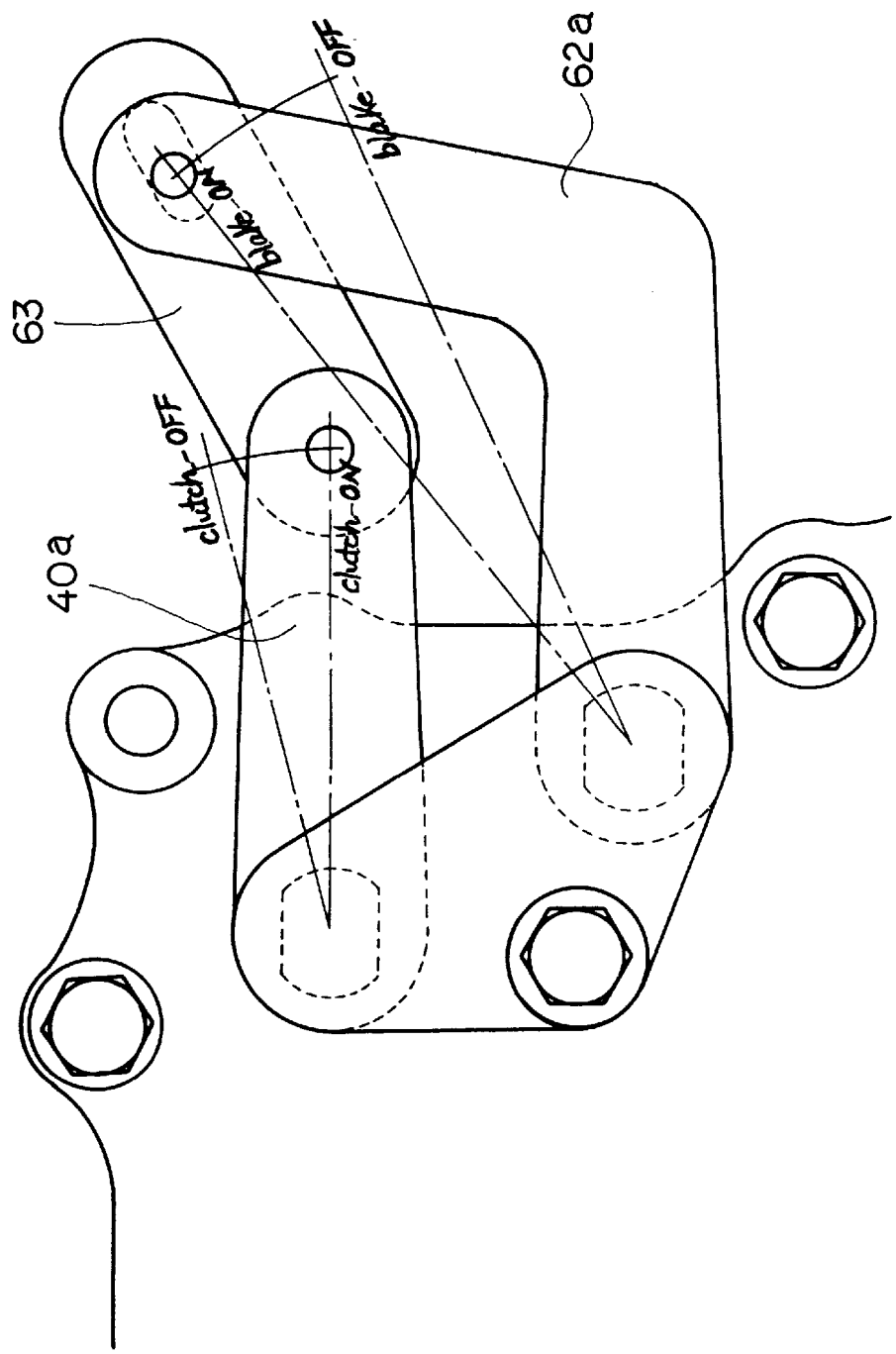
Figure 10:
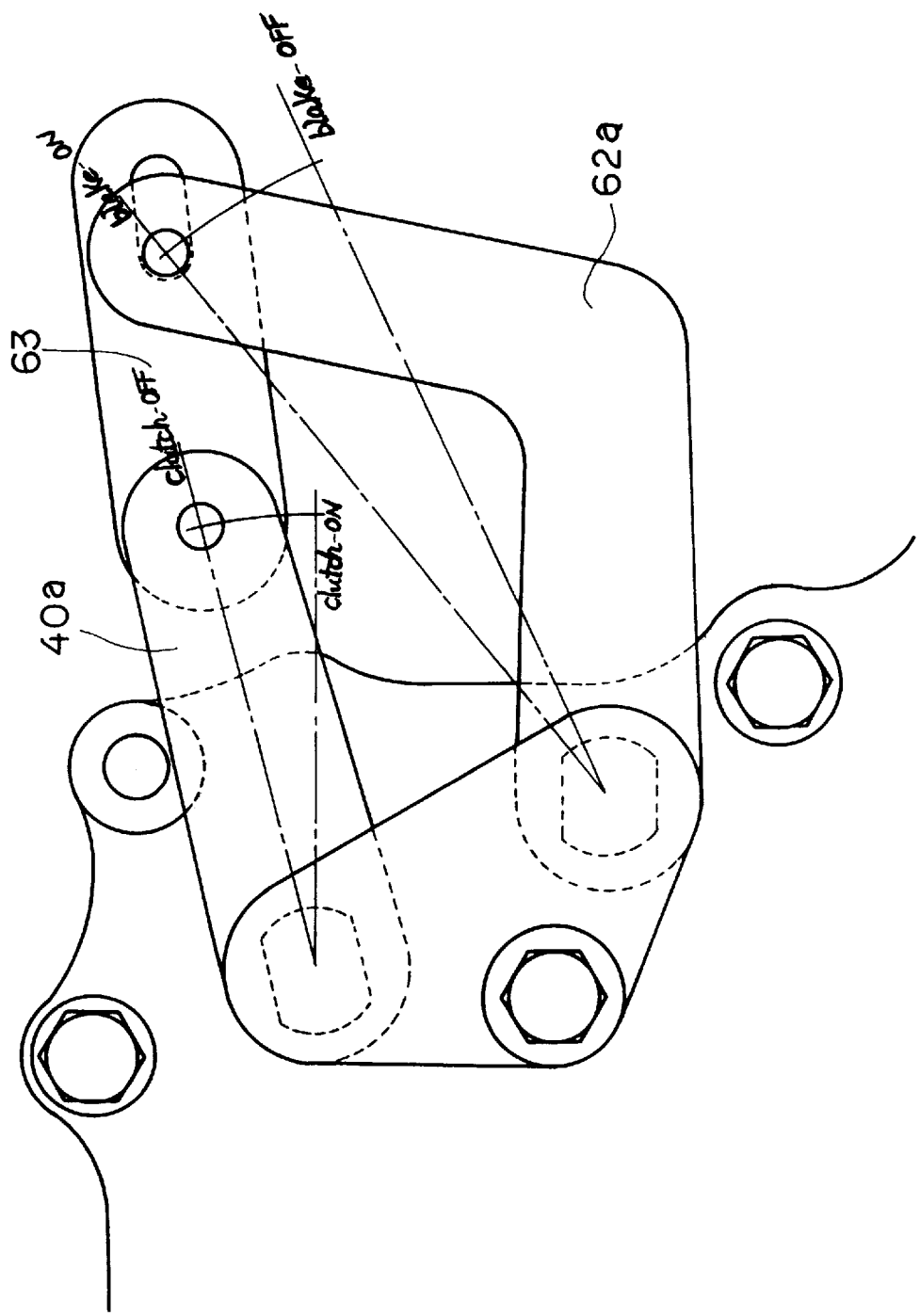

Explained below with reference to FIGS. 8–10 is the internal operation of the thus-constructed clutch pedal 102, clutch arm 40 and the brake arm 62. FIGS. 8–10 show three stages in which the clutch pedal 102 is released, stepped on and completely stepped, respectively. In the figures, the terms clutch-ON and clutch-OFF indicate the positions of the swing arm 40a of the clutch arm when the friction clutch 38 (see FIG. 4) engages and disengages, respectively. The terms brake-ON and brake-OFF indicate the positions of the swing arm 62a of the brake arm when the brake mechanism is actuated and released, respectively.

As described above, the clutch arm 40 and the brake arm 62 are constantly biased counterclockwise. Accordingly, in the first mode where the clutch pedal 102 is not pressed down, the swing arm 40a of the clutch arm is in the position where the friction clutch engages, and the swing arm 62a of the brake arm is in the position where the brake mechanism is released, as shown in FIG. 8.

When the clutch pedal starts to be pressed in the first mode, as shown in FIG. 9, the link member 63 moves counterclockwise via the connecting member 68 as viewed from above. At this point, since the spring member 66 is set to urge the swing arm 40a of the clutch arm more than the spring member 67 urges the swing arm 62a of the brake arm, the swing arm 40a of the clutch arm does not move, but only the swing arm 62a of the brake arm moves to the brake-ON position cooperatively with the link member 63 (see FIG. 9). This is the second mode where the clutch engages and the brake is actuated.

When the clutch pedal is further stepped from the second mode and then completely stepped down, the swing arm 62a is pulled by the link member 63 and moved to the clutch-OFF position (see FIG. 10). This is referred to as the third mode in which the clutch is disengaged and the brake is actuated.

As described, according to the present embodiment, the clutch arm 40 and the brake arm 62 are coupled by the link member 63 so as to constitute a link mechanism. Further, according to the present embodiment, the biasing force is made different between the spring members 66 and 67 that urge the swing arms 40a and 62a. Therefore, the swing arm 62a of the brake arm alone swings firstly during speed-change operation. Thereby, the brake mechanism can be prevented from being released when the clutch is out of engagement, effectively preventing the mower from moving rearward (or forward) unexpectedly during speed-change operation on a slope or the like.

However, since the brake is actuated with the clutch being engaged, the output gear 44 (see FIG. 4) is braked with drive power being transmitted to the shaft of the output gear 44. The second mode may possibly stall the engine although the possibility is low (because the second mode continues only for a moment in the course of the clutch pedal being pressed). By contrast, according to the present embodiment, the maximum transmittable torque of the friction clutch is made lower than the engine output torque to thereby prevent the disadvantage. That is, when the maximum transmittable torque of the clutch is made lower than the engine output torque, the driving member of the friction clutch slips relative to the driven member of the clutch in the second mode, so that drive power is not transmitted to the output shaft. Accordingly, it is possible to prevent the output shaft form being braked with drive power being transmitted to the output shaft, thereby preventing the engine from stalling.

According to the present embodiment, a differential gear mechanism 70 is arranged to the rear end of the casing 21 and to the said second side in a width direction of the casing 21 as shown in FIG. 4, which mechanism transmits drive power from the output gear 44 to a pair of axles 4, 4. The differential gear mechanism 70 comprises a ring-shaped input gear 71 meshing with the output gear 44 at its periphery and receiving the facing ends of the pair of axles in its central bore; pair of side bevel gears 72, 72 supported on the pair of axles 4, 4; and bevel pinions 73, 73 located within radial holes of the input gear 71 and meshing with the pair of side bevel gears 72, 72.

The connection between the axles 4, 4 and the side bevel gears 72 is as follows. A through hole is provided in the axles 4, 4, which holes extend perpendicular to the axes of the axles 4. The respective side bevel gears 72, 72 are provided with a pair of grooves that extends radially outwardly from the central hole of the input gear 71 and opens axially outwardly of the bevel gear. Inserted into each through hole of the axles is a pin 74. The opposite ends of the pin 74 project radially outwardly of the axle. The projecting portions of the pin are inserted into the grooves of the side bevel gear. With this construction, it is possible to connect the side bevel gear 72 with the axle 4 non-rotatably relative thereto, without snugly fitting the former to the latter, thereby readily processing and assembling these components and improving the power transmitting efficiency of the transmission.

According to the thus-constructed transmission, it is possible to obtain the following advantages in addition to the above-described.

According to the transmission of the present embodiment, the first intermediate shaft 23, the second intermediate shaft 24, and the axles 4, 4 are arranged in this order from the front end of the casing 21 and substantially in parallel as described above, wherein the input shaft 22 for transmitting drive power to the first intermediate shaft 23 is arranged to said first side of the casing 21, and the friction clutch 38 on the first intermediate shaft 23 is arranged to the said second side of the casing 21. Further, the shifter mechanism 48 on the second intermediate shaft 24 is arranged to the said first side of the casing 21, and the differential gear mechanism 70 for driving the axles is arranged to the said second side of the casing 21. More specifically, the friction clutch 38, the shifter mechanism 48 and the differential gear mechanism 70, which require much space to be installed, are arranged not to be directly opposed to each other. Accordingly, it is possible to reduce the amount of dead space in the casing without these component contacting each other to thereby downsize a transmission.

Figure 5:
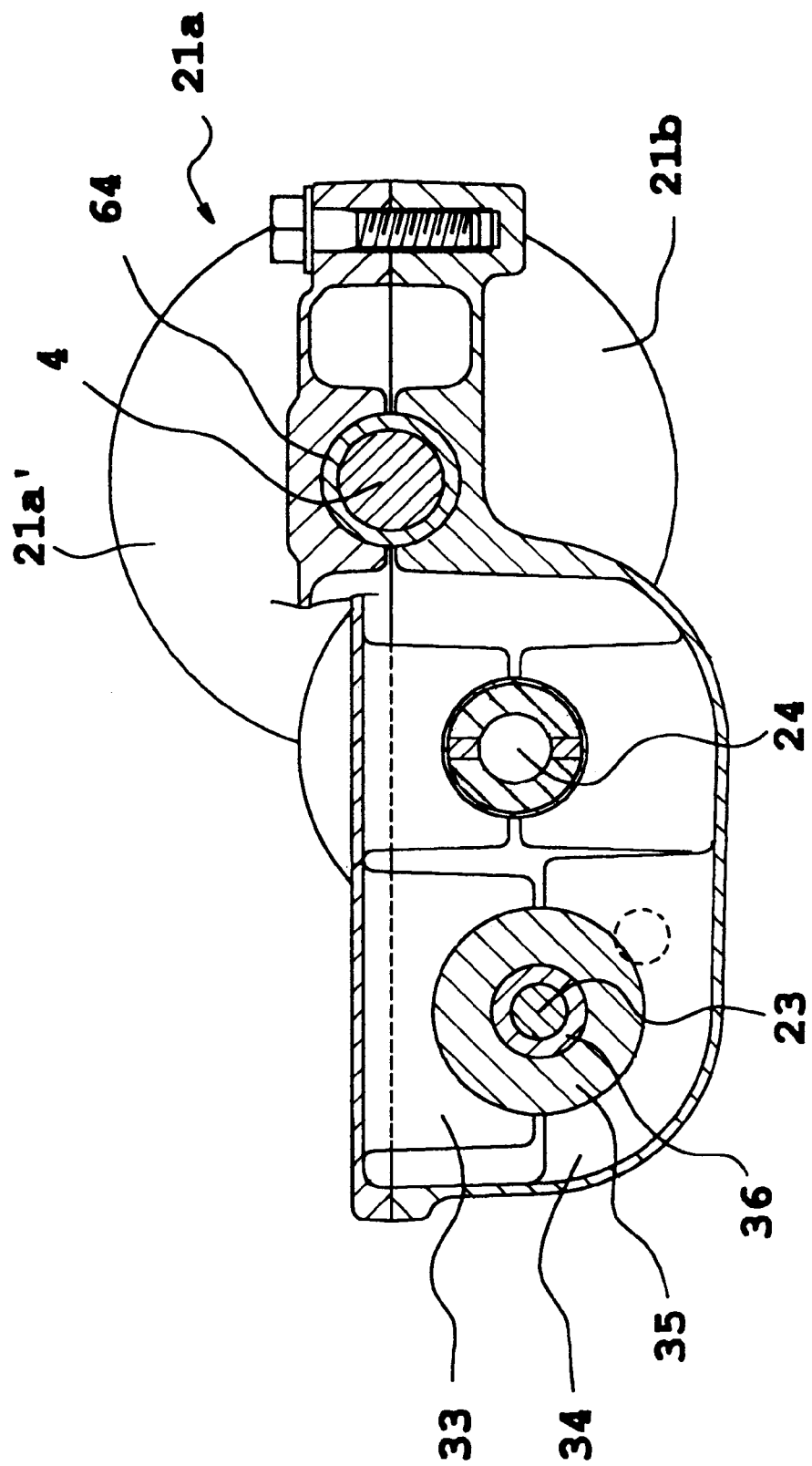
FIG. 5 is a sectional view taken along Line A—A of FIG. 4.

Since the input gear 71 of the differential gear 70 is lager than the other structural components of the transmission, it is necessary to raise a portion 21a' for accommodating the ring gear as compared with the remaining portion as shown in FIGS. 3 and 5. Accordingly, when the horizontal distance between the input shaft 22 and the differential gear 70 is short, the lower part of the cutter blade driving pulley 10 needs to be located upper than the upper part of the raised portion 21a' in order that the cutter blade driving pulley 10 mounted on the input shaft 22 does not contact the raised portion 21a' of the casing 21. According to this construction, the vehicle frame located upper than the pulley 10, the engine and other related parts mounted on this frame must be installed at upper portions of the mower. Therefore, the center of gravity of the mower is high and the running stability is thereby worsened.

On the other hand, according to the transmission of the present embodiment, since the input shaft 22 and the differential gear 70 are arranged diagonal to each other with respect to the center of the casing as viewed from the above in FIG. 4, the horizontal distance therebetween is enlarged. Accordingly, as shown in FIG. 3, even if the lower part of the pulley 10 is located lower than the upper part of the raised portion 21a' of the casing 21, the contact therebetween can be prevented, whereby it is possible to mount the engine and the related parts located above the pulley at a lower portion of the mower, thereby improving the running stability of the mower because of lower center of gravity.

Figure 11:
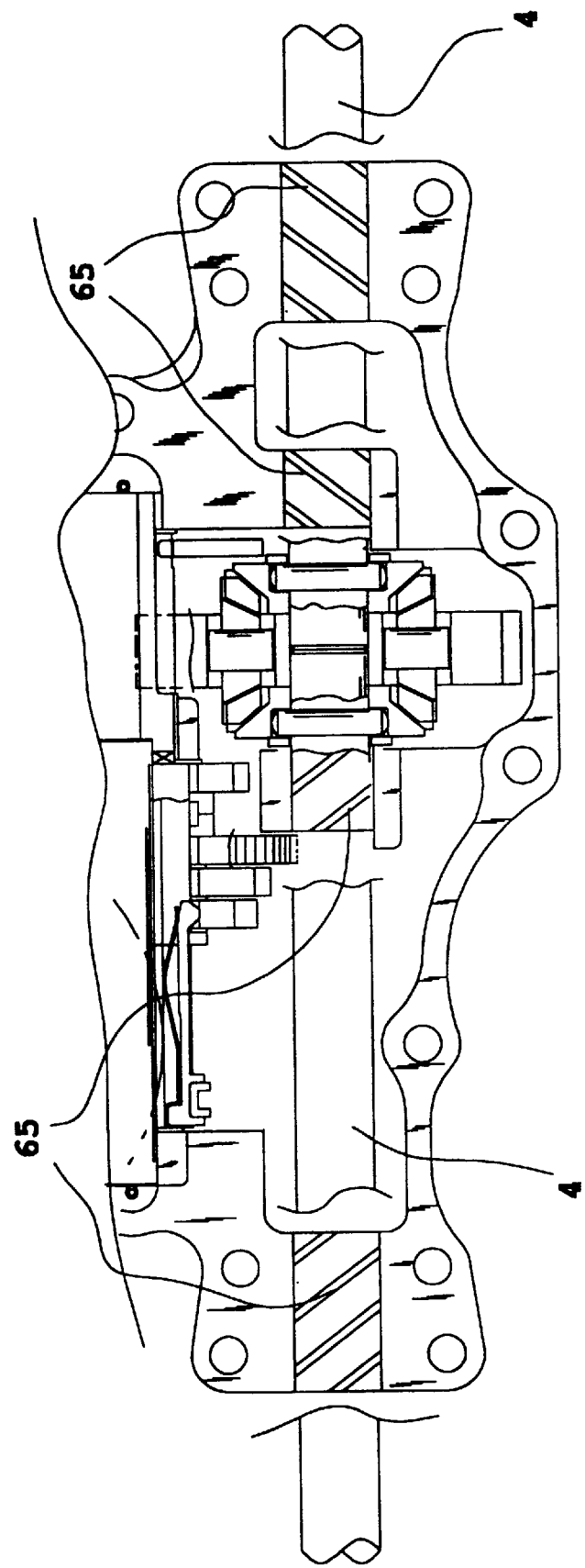
FIG. 11 is a view showing a casing according to another embodiment.

According to the present embodiment, the bushes 64 are provided between the axles and the casing (FIGS. 4 and 5). In lieu of using bushes, lubricating oil such as grease may be applied to grooves 65 formed in the portion of the casing contacting the axles (see FIG. 11). As shown in FIG. 11, the groove 65 is formed such that the lubricating oil may flow into the transmission case when the vehicle moves forward. Usually, since vehicles are driven forward for a longer period than driven rearward, it is possible to prevent the lubricating oil from flowing outside of the transmission with this construction.

Further, according to the present embodiment, the engine, the transmission and the mower are arranged between the front and rear wheels. However, the present invention is not limited to the riding lawn mower having such a construction. For example, the present invention can be applied to such a riding mower as having a mower mounted at the front portion, and also can be applied to a riding lawn mower having the engine and the transmission disposed behind the rear axles.

Embodiment 2

Figure 12:
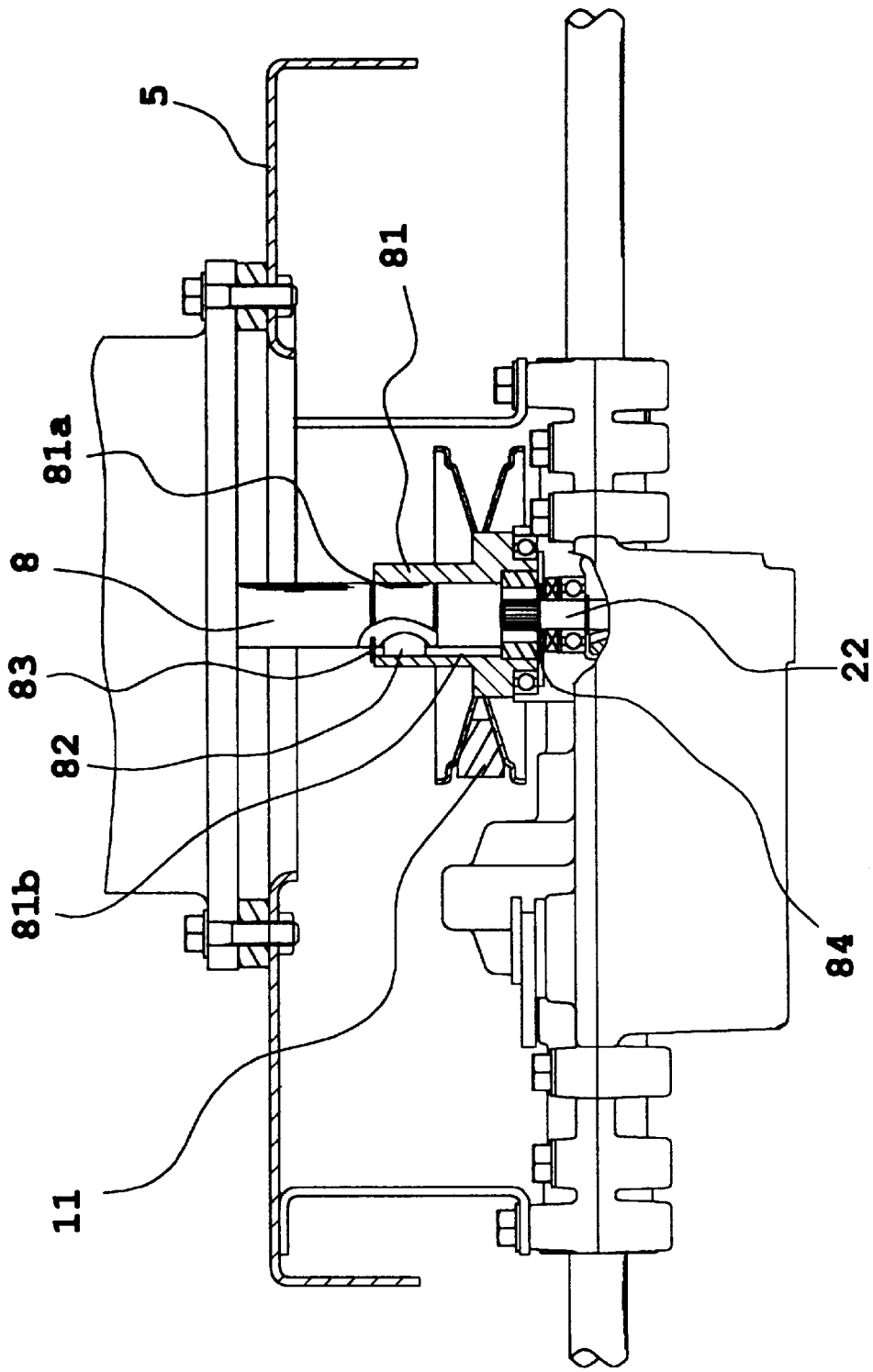
FIG. 12 is a partial front elevation showing the mechanism for transmitting drive power from the engine to the transmission and the mower of the riding lawn mower of Embodiment 2 of the present invention.
Figure 13:
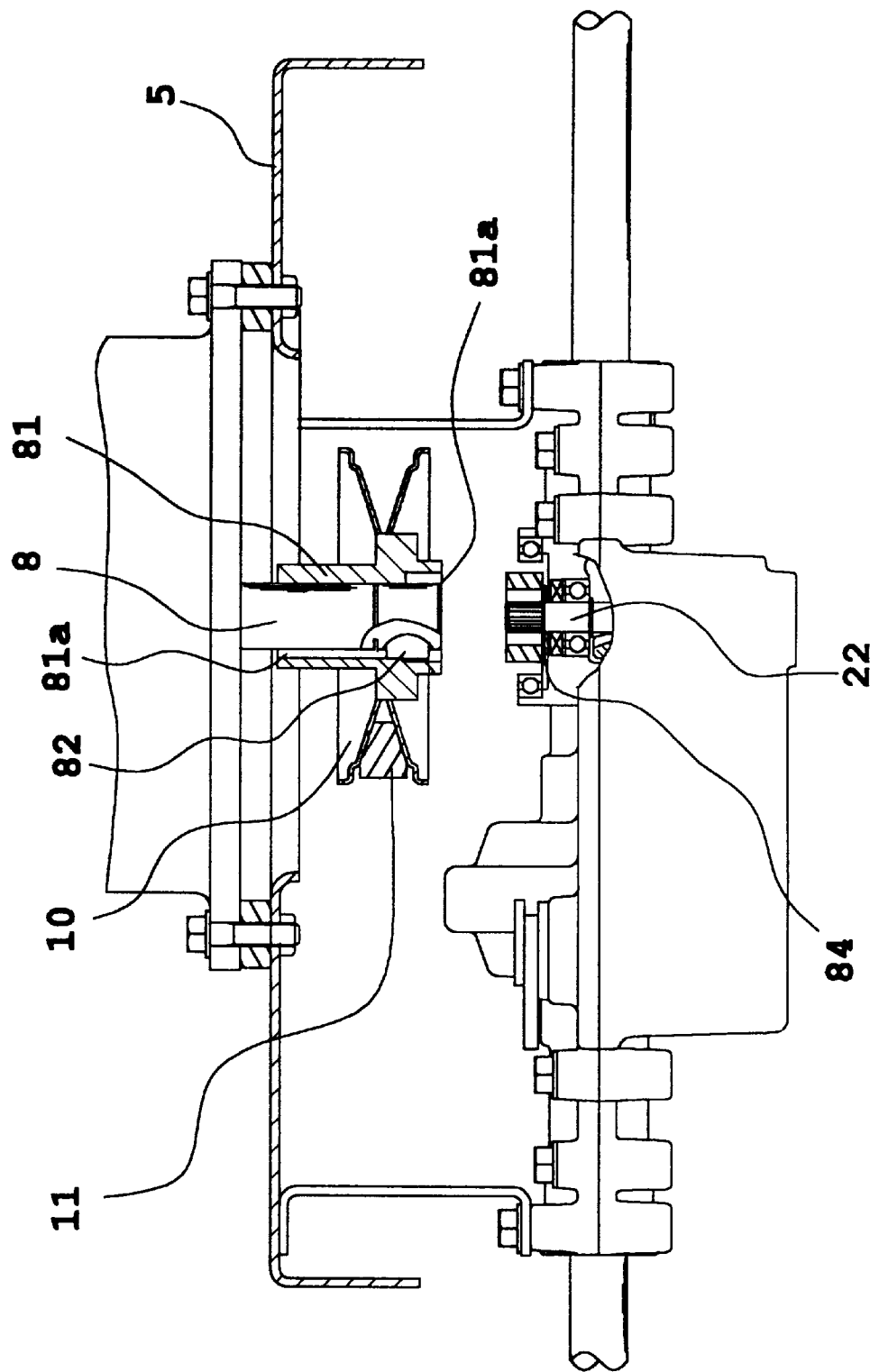
FIG. 13 is a view showing the power transmitting portion having a V-belt being replaced.

Explained below with reference to FIGS. 12 and 13 is the second embodiment of the riding lawn mower according to the present invention. FIG. 12 shows a power transmitting portion of the riding lawn mower of the present embodiment, which portion transmits drive power from an engine output shaft to an input shaft and a cutter blade driving shaft. FIG. 13 illustrates the power transmitting portion having a belt being replaced.

According to the riding lawn mower of Embodiment 2, the lower end of the engine output shaft 8 is made distant from the upper end of the transmission input shaft 22, so that a V-belt can be inserted therebetween, and a coupling 81 is used in lieu of the coupling 12. In the drawings, the same reference numerals denote like parts and assemblies, and the explanations therefor are omitted.

As shown in FIG. 12, the engine output shaft 8 is coupled, via the coupling 81, to the transmission input shift 22 non-rotatably relative thereto in such a manner that the lower end of the engine output shaft 8 is distant from the upper end of the transmission input shaft 22, so that the V-belt can be inserted therebetween.

An axially extending long groove 81b is formed in the inner surface of a through hole 81a of the coupling 81. Inserted in the long groove 81b is a key 81 that engages the output shaft 8. More specifically, the coupling 81 is not rotatable relative to the output shaft 8 and the input shaft 22, but slidable axially of the outputs shaft 8. In the drawings, the reference numerals 83 and 84 denote stopper rings for preventing the coupling 81 from axially sliding during power transmission.

According to the riding lawn mower of Embodiment 2, it is possible to obtain the following advantages in addition to those of Embodiment 1.

According to Embodiment 1, as shown in FIG. 2, there is no space provided for passing the V-belt 11 between the lower end of the engine output shaft 8 and the upper end of the transmission input shaft 22, it is necessary to detach the engine 7 or the transmission 20 from the frame 5 to replace the V-belt 11. Thus, the efficiency of maintenance operation is low.

By contrast, according to the present embodiment, the lower end of the engine output shaft 8 is arranged distant from the upper end of the transmission input shaft 22 so that the V-belt can be inserted therebetween, and the coupling 81 is axially slidable relative to the output shaft 8. Accordingly, by detaching the stopper ring 83 and sliding the coupling 81 upwardly as shown in FIG. 13, it is possible to replace the V-belt 11 without detaching the engine 7 and the transmission 20 from the frame 5, thereby improving the efficiency of maintenance operation.

According to the present embodiment, the coupling is axially slidable relative to the output shaft. However, the coupling may be constructed to axially slide relative to the input shaft.

Embodiment 3

Figure 14:
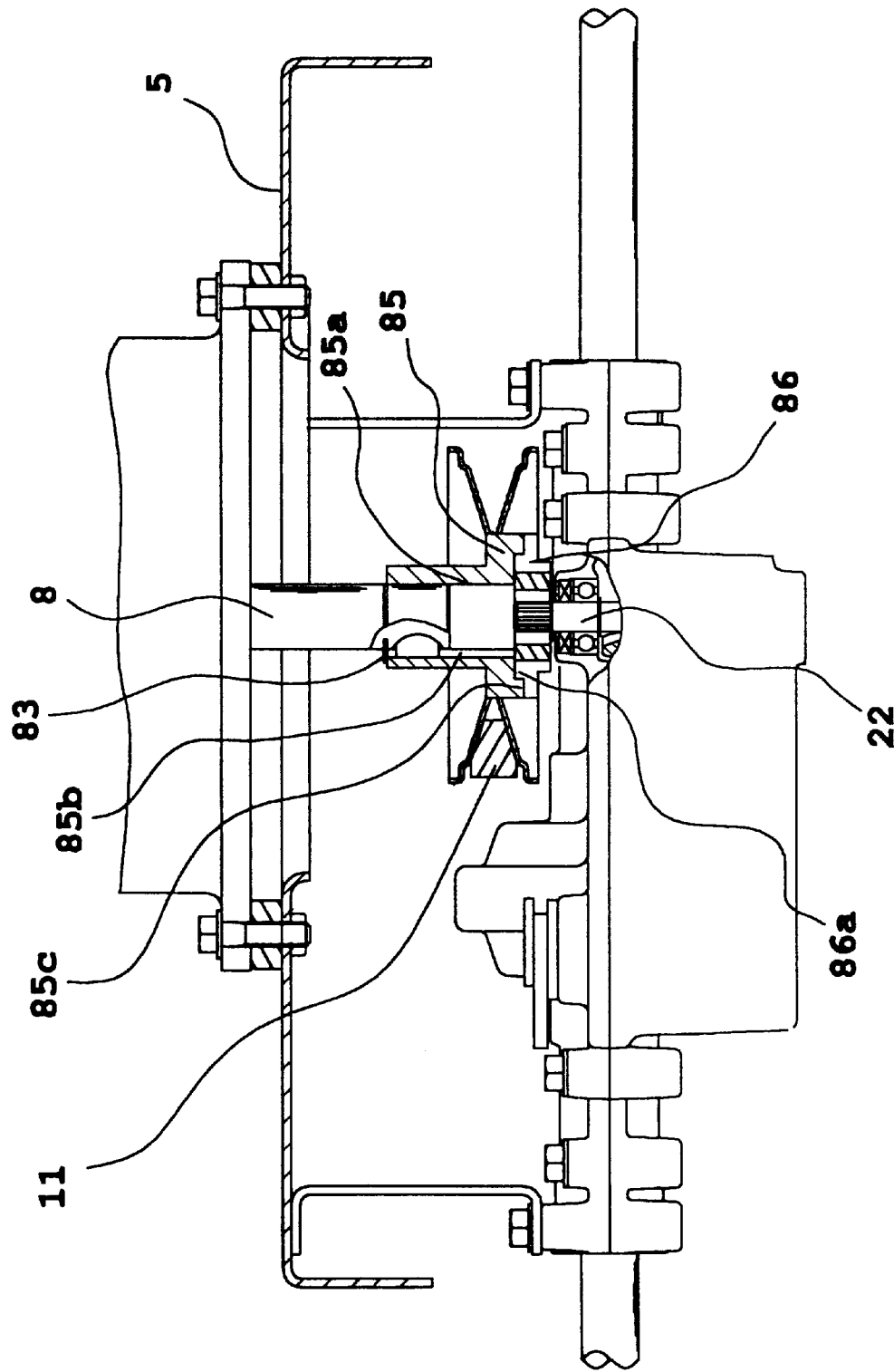
FIG. 14 is a partial front elevation showing the mechanism for transmitting drive power from the engine to the transmission and the mower of the riding lawn mower of Embodiment 3 of the present invention.
Figure 15:
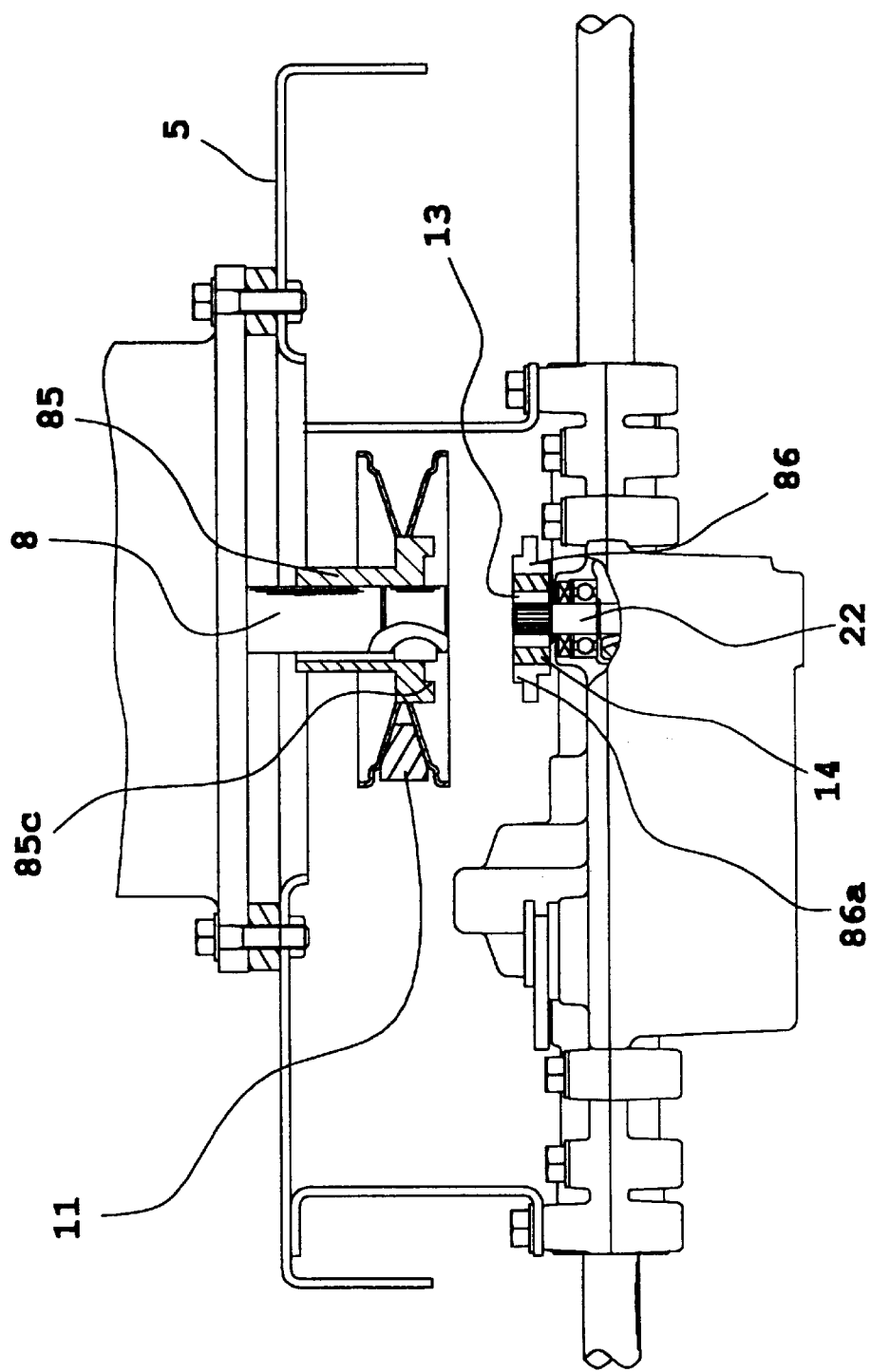
FIG. 15 is a view showing the power transmitting portion having a V-belt being replaced.

Explained below with reference to FIGS. 14 and 15 is the preferred third embodiment of the riding lawn mower according to the present invention. FIG. 14 shows a power transmitting portion of the riding lawn mower of the present embodiment, which portion transmits drive power from an engine output shaft to an input shaft and a cutter blade driving shaft. FIG. 15 illustrates the power transmitting portion having a belt being replaced.

According to the riding lawn mower of Embodiment 3, a first coupling 85 and a second coupling 86 are used in lieu of the coupling 81 of Embodiment 2. In the figures, like parts and assemblies as in the previous embodiments are denoted by the same reference numerals, and the explanations therefor are omitted.

As shown in FIG. 14, fitted to the lower end of the engine output shaft 8 is the first coupling 85 which has an axially extending long groove 85b provided in the inner surface of a through hole 85a and also has a polygonal recess 85c formed at its lower end. A key 82 is inserted in the long groove 85b of the first coupling 85 so as to engage the end portion of the outer surface of the engine output shaft 8. More specifically, the first coupling 85 is supported on the output shaft 8 in a non-rotatable and axially slidable manner by the long groove 85b and the key 82.

The second coupling 86 is non-rotatably fitted, via a bearing 13 and a resilient member 14, at the upper end of the transmission input shaft 22 non-rotatably relative thereto. The second coupling 86 is supported at its lower end by the casing 21. Formed on the upper face of the second coupling 86 is a polygonal projection 86a for engaging the recess 85c of the first coupling. More specifically, the first coupling 85 and the second coupling 86 are coupled to each other in a non-rotatable and axially separatable manner.

The thus-constructed riding lawn mower has the same advantages as those of Embodiment 2.

According to the present embodiment, the first coupling is axially slidable on the output shaft, but alternatively, the second coupling may be axially slidable along the input shaft.

Embodiment 4

Figure 16:
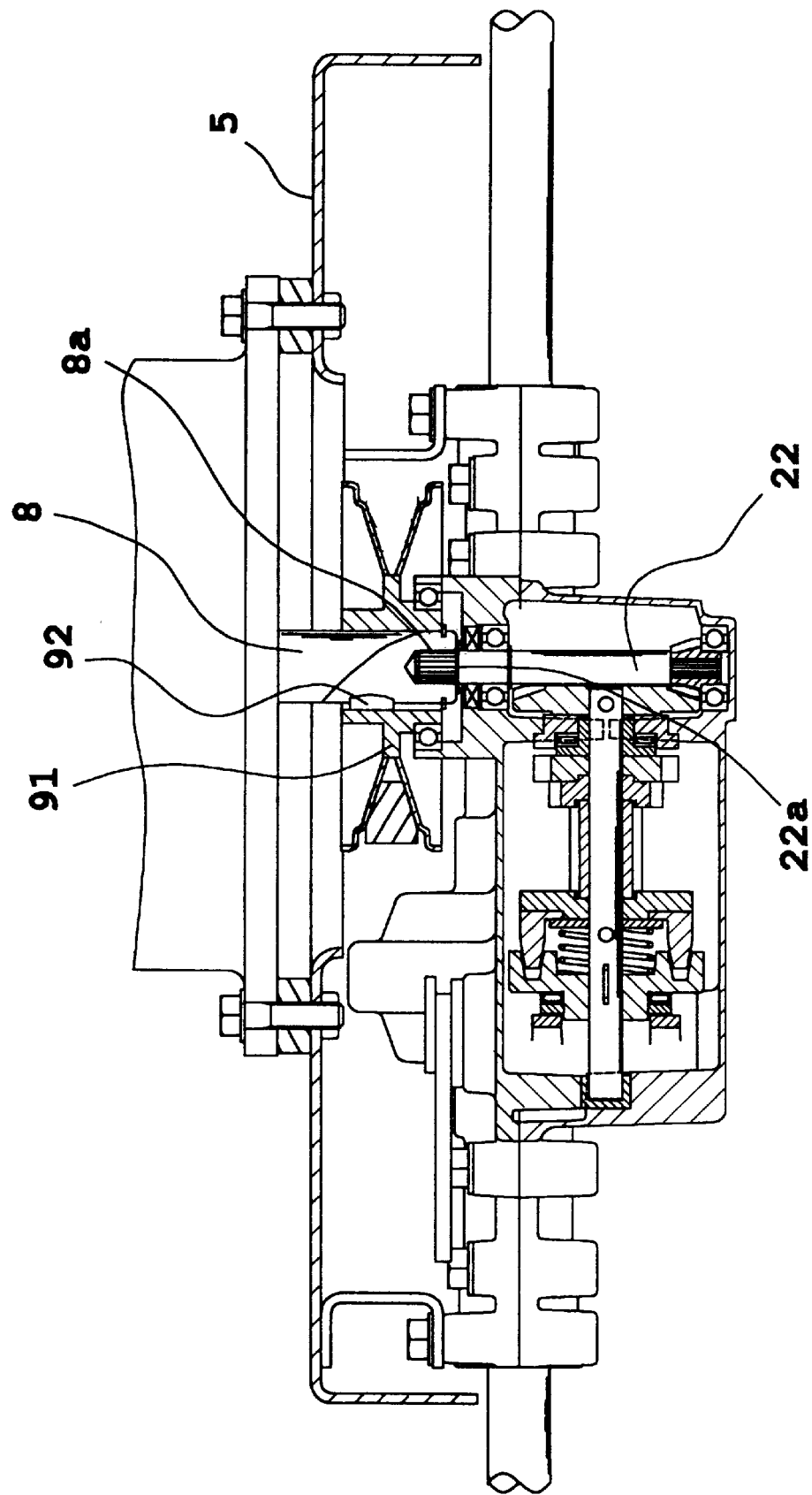
FIG. 16 is a partial front elevation showing the mechanism for transmitting drive power from the engine to the transmission and the mower of the riding lawn mower of Embodiment 4 of the present invention.

Explained below with reference to FIG. 16 is the preferred forth embodiment of the riding lawn mower according to the present invention. FIG. 16 shows a power transmitting portion of the riding lawn mower of the present embodiment, which portion transmits drive power from an engine output shaft to an input shaft and a cutter blade driving shaft.

The riding lawn mower of the present embodiment has an engine output shaft and a transmission input shaft directly coupled without using a coupling member. In the figure, like parts and assemblies as in the previous embodiments are denoted by the same reference numerals, and the explanations therefor will be omitted.

The engine output shaft 8 is provided with a female spline 8a extending axially from the lower end of the shaft. The outputs shaft 8 and the pulley 10 are coupled, via an intermediate member 91 and a key 92, with each other non-rotatably relative thereto. The intermediate member 91 is supported from below by the casing. Formed on the outer surface of the upper end portion of the transmission input shaft 22 is a male spline 22a for engaging the female spline formed in the output shaft.

Thus, according to the present embodiment, drive power is directly transmitted from the output shaft 8 to the input shaft 22, whereby it is possible to improve power transmitting efficiency and reduce production cost due to the reduced number of parts.

Embodiment 5

Figure 17:
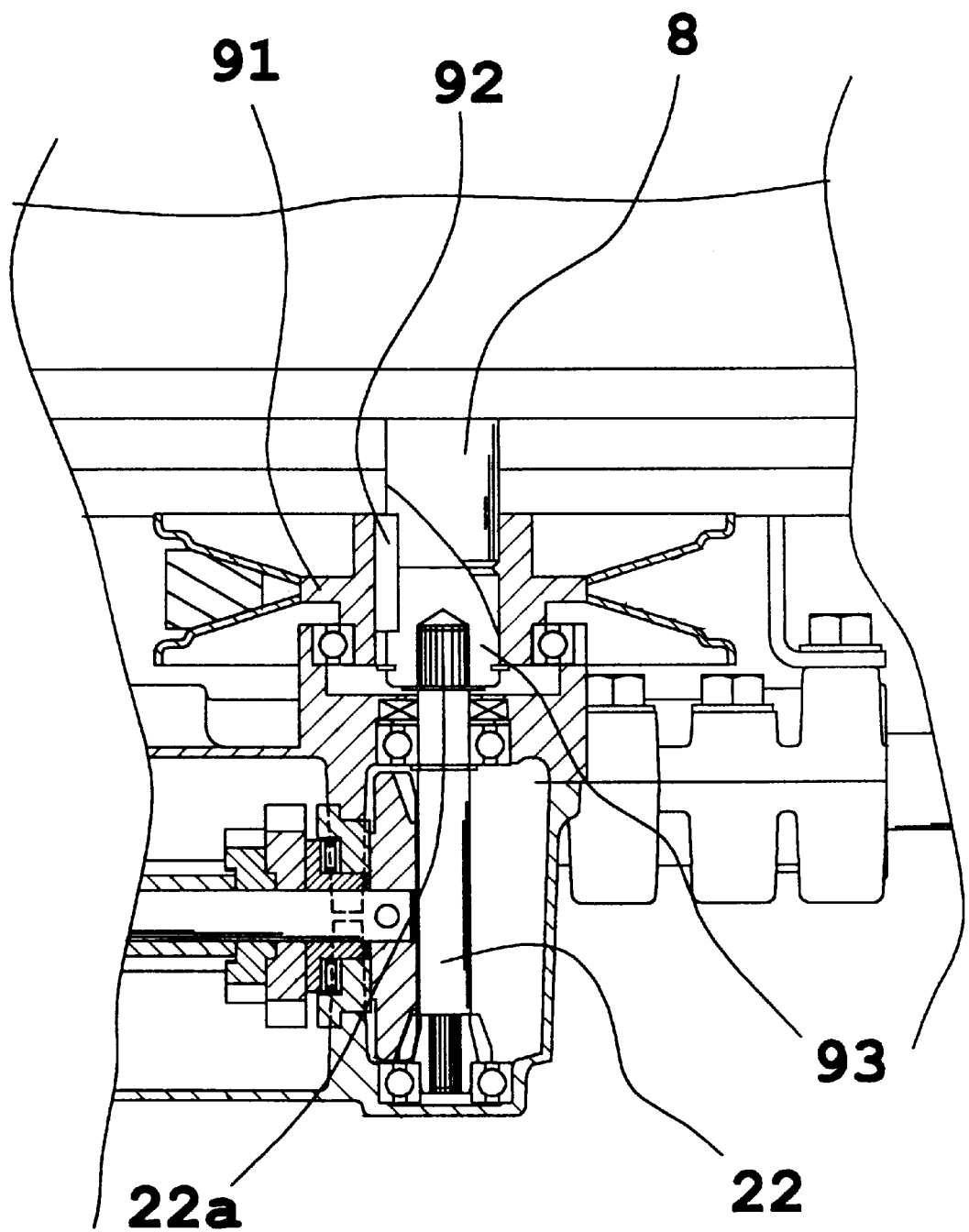
FIG. 17 is a partial front elevation showing the mechanism for transmitting drive power from the engine to the transmission and the mower of the riding lawn mower of Embodiment 5 of the present invention.
Figure 18:
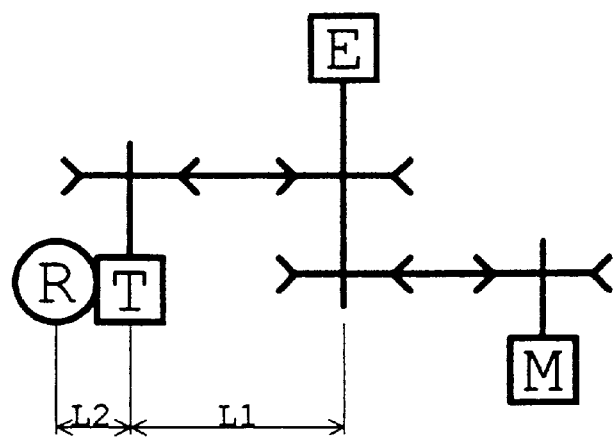
FIG. 18 is a schematic view schematically showing the arrangement of the engine, transmission and rear axles of a prior art riding lawn mower.
Figure 19:
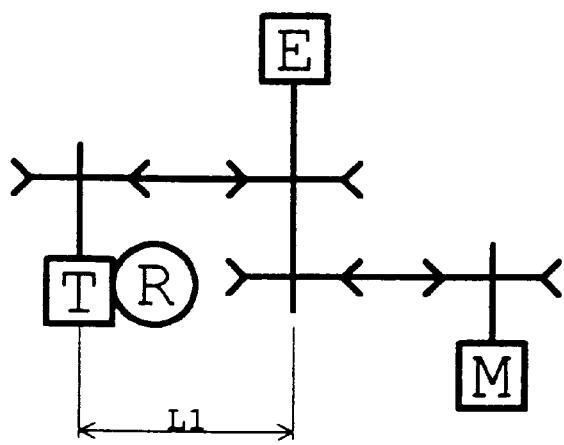
FIG. 19 is a schematic view schematically showing the arrangement of the engine, transmission and rear axles of another prior art riding lawn mower.

Explained below with reference to FIG. 17 is the preferred fifth embodiment of the riding lawn mower according to the present invention. FIG. 17 shows a power transmitting portion of the riding lawn mower of the present embodiment, which portion transmits drive power from an engine output shaft to an input shaft and a cutter blade driving shaft.

The riding lawn mower of the present embodiment has an engine output shaft and an transmission input shaft coupled via a key 92 with each other as a single unit and a resilient member 93. In the figures, like parts and assemblies as in the previous embodiments are denoted by the same reference numerals, and the explanations therefor are omitted.

Disposed below the engine output shaft 8 is the resilient member 93 provided with a key groove corresponding to the key 92. The resilient member 93 is provided with a female spline 93a extending axially from the lower end of the resilient member to engage the male spline 22a on the input shaft 22.

Thus, according to the riding lawn mower of the present embodiment, drive power is transmitted from the output shaft 8 to the transmission shaft 22 via the key 92 and the resilient member 93, whereby it is possible to obtain the same advantages as those of Embodiment 1.

While the preferred embodiment has been illustrated and described, other changes and modifications may be made without deviating from the invention concepts set forth above.

What is claimed is:

1. A riding lawn mower comprising:
   two pairs of ground engaging wheels disposed at front and rear portions of a vehicle frame;
   a cutter blade supported by the vehicle frame;
   a drive source mounted on the vehicle frame and having an output shaft extending downwardly;
   a transmission including
   i) a casing;
   ii) an input shaft substantially vertically supported by the casing, and
   iii) a pair of axles extending substantially horizontally in opposite directions, the pair of axles supporting each one of the two pairs of ground engaging wheels,
   the transmission being arranged below the drive source and having the input shaft coupled substantially coaxially with the output shaft of the drive source non-rotatably relative thereto; and
   a power transmitter for the cutter blade, the power transmitter being provided to rotate with the output shaft.

2. A riding lawn mower according to claim 1, wherein the transmission is of a gear type having a friction clutch provided between the input shaft and the axles.

3. A riding lawn mower according to claim 1, wherein the transmission has the input shaft arranged to the front end of the casing and to one side of the casing and also has the axles arranged to the rear end of the casing,
   and wherein the transmission has a differential gear arranged to the rear end of the casing and to the other side of the casing.

4. A riding lawn mower according to claim 3, wherein the casing of the transmission has a raised portion for accommodating the differential gear, the upper part of the raised portion being located higher than the lower part of the power transmitting member for the cutter blade.

5. A riding lawn mower according to claim 1, wherein the output shaft of the drive source is relatively non-rotatably coupled with the input shaft of the transmission via a coupling engaging the lower and upper portions of both shafts.

6. A riding lawn mower according to claim 5, wherein the transmitter for the cutter blade is a pulley provided on the outer surface of the coupling and a belt.

7. The riding lawn mower according to claim 5, wherein the coupling has a recessed portion for receiving and supporting one of a lower end of the output shaft of the drive source or an upper end of the input shaft of the transmission.

8. The riding lawn mower according to claim 7, wherein the coupling has a second recessed portion for receiving and supporting one of the lower end of the output shaft of the drive source or the upper end of the input shaft of the transmission, which is not supported by the first-mentioned recessed portion.

\* \* \* \* \*

UNITED STATES PATENT AND TRADEMARK OFFICE
CERTIFICATE OF CORRECTION

PATENT NO. : 6,098,386
DATED : August 8, 2000
INVENTOR(S) : Hiroaki Shimizu, et al.

It is certified that error appears in the above-identified patent and that said Letters Patent is hereby corrected as shown below:

On the title page: Item [73] Assignee, please correct the second Assignee "Tuff Toro Corporation" to -- Tuff Torq Corporation--.

Signed and Sealed this

Twenty-second Day of May, 2001

*Attest:*

NICHOLAS P. GODICI

*Attesting Officer*    *Acting Director of the United States Patent and Trademark Office*